(12) United States Patent
Huang et al.

(10) Patent No.: US 7,769,015 B2
(45) Date of Patent: Aug. 3, 2010

(54) HIGH PERFORMANCE NETWORK ADAPTER (HPNA)

(75) Inventors: Kaiyuan Huang, Ottawa (CA); Kenneth E. Neudorf, Carp (CA); Michael F. Kemp, Ottawa (CA)

(73) Assignee: Liquid Computing Corporation, Ottawa, Ontario (CA)

( * ) Notice: Subject to any disclaimer, the term of this patent is extended or adjusted under 35 U.S.C. 154(b) by 280 days.

(21) Appl. No.: 11/853,306

(22) Filed: Sep. 11, 2007

(65) Prior Publication Data

US 2009/0067431 A1 Mar. 12, 2009

(51) Int. Cl.
*H04L 12/28* (2006.01)
(52) U.S. Cl. ............... 370/394; 370/389; 370/473; 370/474; 709/225; 709/234; 709/238
(58) Field of Classification Search ........... 370/412, 370/413, 394, 463, 906, 395.4, 231; 375/240.26, 375/240.08; 709/225, 234, 238, 251
See application file for complete search history.

(56) References Cited

U.S. PATENT DOCUMENTS

| | | | |
|---|---|---|---|
| 6,631,422 B1 | 10/2003 | Althaus et al. | |
| 7,324,553 B1 | 1/2008 | Varier et al. | |
| 2003/0012285 A1* | 1/2003 | Kim | 375/240.26 |
| 2003/0123390 A1* | 7/2003 | Takase et al. | 370/230.1 |
| 2003/0123451 A1* | 7/2003 | Nielsen et al. | 370/395.4 |
| 2003/0236932 A1* | 12/2003 | Saito et al. | 710/52 |
| 2004/0073637 A1 | 4/2004 | Larson et al. | |
| 2004/0078599 A1* | 4/2004 | Nahum | 713/201 |
| 2004/0165525 A1 | 8/2004 | Burak | |
| 2005/0256975 A1* | 11/2005 | Kaniz et al. | 709/250 |
| 2007/0073883 A1* | 3/2007 | Chafle et al. | 709/226 |
| 2007/0076590 A1 | 4/2007 | Galpin et al. | |
| 2007/0110088 A1 | 5/2007 | Kemp | |
| 2007/0141995 A1* | 6/2007 | Youn et al. | 455/69 |
| 2008/0043742 A1* | 2/2008 | Pong et al. | 370/394 |
| 2008/0215910 A1 | 9/2008 | Gabriel et al. | |
| 2008/0247409 A1* | 10/2008 | Choudhury et al. | 370/412 |

FOREIGN PATENT DOCUMENTS

WO 8800732 1/1988

OTHER PUBLICATIONS

International Search Report issued in PCT/CA2008/001498 dated Aug. 22, 2008.
HyperTransport specification; http://www.hypertransport.org/tech/index.cfm.
InfiniBand specification; http://www.infinibandta.org/specs/.

(Continued)

*Primary Examiner*—Pankaj Kumar
*Assistant Examiner*—Anez Ebrahim
(74) *Attorney, Agent, or Firm*—DLA Piper LLP (US)

(57) ABSTRACT

A high performance network adapter is provided for forwarding traffic and providing adaptation between packetized memory fragment based processor links of multiple CPUs and multiple switch planes of a packet switching network. Low latency for short and long packets is provided by innovative packet reassembly, overlapping transmission, and reverse order transmission in the upstream direction, and cut through operation in the downstream direction.

71 Claims, 7 Drawing Sheets

OTHER PUBLICATIONS

ANSI/IEEE Std 802.1D, 1998 Edition, Part 3: Media Access Control Bridges, (C) 1998, IEEE.

David Davis, Apr. 28, 2008 Teaming NICs achieves load balance and failover on VMware ESX, printed from http://searchvmware.techtarget.com/tip/0,289483,sid179_gci1311518,00.html.

Understanding and Configuring Spanning Tree Protocol (STP) on Catalyst Switches, CISCO Document IF 5234, printed from http://searchvmware.techtarget.com/tip/0,289483,sid179_gci1311518,00.html.

Understanding Rapid Spanning Tree Protocol (802.1w). CISCO Document ID 24062, printed from http://searchvmware.techtarget.com/tip/0.289483,sid179_gci1311518,00.html.

Understanding Spanning-Tree Protocol, Cisco Documentation, Copyright 1989-1997 © Cisco Systems Inc., printed from http://www.cisco.com/univercd/cc/td/doc/product/rtrmgmt/sw_ntman/cwsimain/cwsi2/cwsiug2/vlan2/stpapp.htm.

Rapid/Multiple Spanning Tree Protocol (RSTP/MSTP), Copyright 2007 Aricent, Inc., printed from www.futsoft.com/pdf/RSTPMSTPfs.pdf.

William J. Dally, Scalable Switching Fabrics for Internet Routers, Computer Systems Laboratory, Stanford University and Avici Systems, Inc.

\* cited by examiner

HIGH PERFORMANCE NETWORK ADAPTER (HPNA)

BACKGROUND OF THE INVENTION

Field of the Invention

Embodiments of the present invention relate generally to high performance multiprocessor systems in which processors communicate with each other through a packet switching network, and specifically to the interface circuitry for adapting a processor interface to a network link.

In a system such as a massively parallel multi-processor system, or "super computer," containing a large number of CPUs, a large number of communication paths may be required to carry data from one CPU to the other CPUs.

An example of a state of the art high performance computing (HPC) system is a multi-processor system with a high degree of inter-processor communication.

A packet switching network (also often referred to simply as a "switch" or a "network"), for example an InfiniBand switch may provide the connectivity for a multiprocessor system, and permit all processors to communicate. Communication is in the form of data packets that pass from a first CPU through an associated network adapter, the switch, and through another network adapter to a second CPU.

Among the factors that determine the performance of a multiprocessor system are the number of CPUs, the individual CPU performance in terms of CPU cycles or floating point operations per second (FLOPS), and the capacity of the network in terms of packet throughput and latency. Processor to processor latency includes the delay of the network and the network adapters. The latency of the network adapter and the delay of the switching network are crucial for the performance of the multiprocessor system as a whole.

Consequently there is a need for the development of a low latency network adapter.

SUMMARY OF THE INVENTION

Accordingly, an embodiment of the present invention is a network adapter. The network adapter may include an array of downstream packet processors, each downstream packet processor being configured to process an incoming data packet received from a network. The network adapter includes an upstream packet processor, the upstream packet processor being configured to process an outgoing data packet to be transmitted over the network. The upstream packet processor may include a direct memory access (DMA) engine configured to read the outgoing data packet from a memory of a processor and to transfer the read outgoing data packet; a packet buffer, and a reassembly state machine (RSM) configured to receive the transferred outgoing data packet from the processor as a plurality of out-of-order fragments and to store the received plurality of out-of-order fragments in the packet buffer in a correct sequential order as a reassembled outgoing data packet.

According to further embodiments, each fragment may include fragment data and an associated fragment address, and the RSM may be configured to store the fragment data of each fragment in the packet buffer at the fragment address associated with the fragment data. The network adapter may further include a plurality of physical I/O blocks, each of the physical I/O blocks being coupled to the network. The network may include a plurality of packet switching planes, and each of the plurality of physical I/O blocks may be coupled to one of the plurality of packet switching planes of the network. Each fragment may include a plurality of words and the network adapter further may include a plurality of plane output queues (POQ), each of the POQ being coupled to a corresponding one of the plurality of physical I/O blocks and each being configured to read words from the packet buffer. Each of the POQs may include means to select one of a number of alternative paths that are available in the corresponding one of the plurality of packet switching planes of the network. The outgoing data packet may include a first fragment having a first word and a last fragment having a last word and the RSM may be further configured to store the first word and the last word of the outgoing data packet in at least one of the plurality of POQ. A selected one of the plurality of POQ may be configured to read all but the first and last words of the outgoing packet from the packet buffer and to send the stored first word, the words read from the packet buffer and the stored last word to the physical I/O block associated with the selected POQ for transmission to the packet switching plane coupled to the selected physical I/O block. The selected POQ may be configured to read all but the first and last words of the outgoing packet from the packet buffer in a reverse order. The first word may include information related to a length of the outgoing packet and a destination of the outgoing data packet on the network.

The RSM may be configured to release at least one fragment of the outgoing data packet from the packet buffer for transmission over the network before all remaining fragments of the outgoing data packet have been received in the packet buffer. The RSM may be configured to release at least one fragment of the outgoing data packet from the packet buffer for transmission over the network when all of the fragments of the outgoing data packet are stored in the packet buffer. The RSM may be configured to release at least one fragment of the outgoing data packet from the packet buffer for transmission on the network when an adjustable fill level threshold of the packet buffer is reached. The DMA engine may be further configured to read and transfer the read outgoing data packet such that the out-of-order fragments are received by the RSM in reverse order, relative to the order in which the outgoing data packet was stored in the memory of the computer. Each downstream packet processor of the array of downstream packet processors may be configured to forward the incoming data packet received from the network into a memory of a destination processor. Each downstream packet processor of the array of downstream packet processors may be further configured to store the incoming data packet received from the network in an internal memory if the memory of the destination processor is full.

According to another embodiment thereof, the present invention is a computer that includes a network and a plurality of compute modules. Each compute module may be coupled to the packet network and each may include a plurality of processors and a network adapter, the network adapter being coupled to each of the plurality of processors. The network adapter may include an array of downstream packet processors, each downstream packet processor being configured to process an incoming data packet received from the network. The computer may include an upstream packet processor, the upstream packet processor being configured to process an outgoing data packet to be transmitted over the network. The upstream packet processor may include a direct memory access (DMA) engine configured to read the outgoing data packet from a memory of a processor and to transfer the read outgoing data packet; a packet buffer, and a reassembly state machine (RSM) configured to receive the transferred outgoing data packet from the processor as a plurality of out-of-order fragments and to store the received plurality of out-oforder fragments in the packet buffer in a correct sequential order as a reassembled outgoing data packet.

Each fragment may include fragment data and an associated fragment address, and the RSM may be configured to store the fragment data of each fragment in the packet buffer at the fragment address associated with the fragment data. The computer may also include a plurality of physical I/O blocks, each of the physical I/O blocks being coupled to the network. The network may include a plurality of packet switching planes, and each of the plurality of physical I/O blocks may be coupled to one of the plurality of packet switching planes of the network. Each fragment may include a plurality of words and the network adapter further may include a plurality of plane output queues (POQ), each of the POQ being coupled to a corresponding one of the plurality of physical I/O blocks and each being configured to read words from the packet buffer. The outgoing data packet may include a first fragment having a first word and a last fragment having a last word and the RSM may be further configured to store the first word and the last word of the outgoing data packet in at least one of the plurality of POQ. A selected one of the plurality of POQ may be configured to read all but the first and last words of the outgoing packet from the packet buffer and to send the stored first word, the words read from the packet buffer and the stored last word to the physical I/O block associated with the selected POQ for transmission to the packet switching plane coupled to the selected physical I/O block. The selected POQ may be configured to read all but the first and last words of the outgoing packet from the packet buffer in a reverse order. The first word may include information related to a length of the outgoing packet and a destination of the outgoing data packet on the network. The RSM may be configured to release at least one fragment of the outgoing data packet from the packet buffer for transmission over the network before all remaining fragments of the outgoing data packet have been stored in the packet buffer. The RSM may be configured to release at least one fragment of the outgoing data packet from the packet buffer for transmission over the network when all of the fragments of the outgoing data packet are stored in the packet buffer. The RSM may be configured to release at least one fragment of the outgoing data packet from the packet buffer for transmission on the network when an adjustable fill level threshold of the packet buffer is reached. The DMA engine may be further configured to read and transfer the read outgoing data packet such that the out-of-order fragments are received by the RSM in reverse order relative to the order in which the outgoing data packet was stored in the memory of the computer. Each downstream packet processor of the array of downstream packet processors may be configured to forward the incoming data packet received from the network into the memory of the destination processor. Each downstream packet processor of the array of downstream packet processors may be further configured to store the incoming data packet received from the network in an internal memory if the memory of the destination processor is full.

Yet another embodiment of the present invention is a method of sending a data packet over a network of a computer system. The method may include steps of providing a network adapter; fragmenting the data packet into a plurality of fragments; beginning to send the plurality of fragments to the network adapter; after the network adapter has received some but not all of the plurality of fragments, transmitting the received fragments from the network adapter to the network; after the network adapter has begun transmitting the received fragments over the network but before all of the data packet are transmitted to the network, receiving any remaining fragments of the data packet into the network adapter, and transmitting the received remaining fragments from the network adapter to the network.

The method may further include a step of providing an adjustable fill level threshold that defines how much of the data packet must be received by the network adapter before the network adapter can begin to transmit received fragments to the network. The adjustable fill level threshold may be less than 100% of the data packet. The method may further include a step of selectively adjusting the fill level threshold downward when a rate at which the network adapter receives fragments of the data packet is greater than a rate at which the network adapter transmits the fragments to the network. The method may also include a step of selectively adjusting the fill level threshold upward when the transmitting steps cannot transmit without interruption.

Yet another embodiment of the present invention is a computer, including a packet switching network; a processor, and a network adapter, the network processor being coupled to the processor and to the packet switching network. The network adapter may be configured to receive constituent fragments of a data packet to be sent over the packet switching network from the processor and to transmit at least one received fragment to the packet switching network before having received all of the constituent fragments of the outgoing data packet from the processor.

The computer may further include an adjustable fill level threshold configured to define how much of the data packet must be received by the network adapter before the network adapter can begin to transmit received fragments to the packet switching network. The adjustable fill level threshold may be less than 100% of the data packet. The network adapter may be further configured to selectively adjust the fill level threshold downward when a rate at which the network adapter receives fragments of the data packet is greater than a rate at which the network adapter transmits the fragments to the packet switching network. The network adapter may be further configured to selectively adjust the fill level threshold upward when the fragments are not received from the processor in time to continue transmitting without interruption to the packet switched network.

The present invention, according to still another embodiment thereof, is a method for receiving and processing a plurality of data packets from a plurality of processors, each of the data packets including a plurality of fragments that are ordered according to a first order. The method may include steps of providing a packet buffer; providing a reassembly state machine (RSM) coupled to the packet buffer; providing a direct memory access engine configured to read the data packets from at least one of the plurality of processors and to transfer the read data packets to the RSM; receiving, in the RSM, the transferred data packets as a plurality of fragments in a second order that is different from the first order, each received fragment including a data fragment and an associated fragment address, and storing the fragment data of each of the received plurality of fragments in the packet buffer at the fragment address associated with the received data fragment, such that the transferred data packets are reassembled and stored in the packet buffer in the first order.

The receiving and storing steps may be effective to receive and reassemble up to P data packets, P being a maximum number of data packets that can be stored in the packet buffer. The method may further include a step of monitoring a fill level of the packet buffer to determine how full the packet buffer is. The reassembled data packets may be released for transmission to a destination processor over a network. The releasing step may be carried out by the RSM. The releasing step may be carried out when a data packet is fully reassembled in the packet buffer. Alternatively, the releasing step may be carried out when only a predetermined portion of a data packet is reassembled in the packet buffer.

Yet another embodiment of the present invention is a method of transmitting a data packet stored in a memory of a processor to a network. The method may include steps of providing a network adapter, the network adapter including a reassembly state machine (RSM), a packet buffer, a Packet Output Queue (POQ) and a physical I/O block coupled to the POQ and to the network; fragmenting the stored data packet into a plurality of fragments, each including a plurality of words, and transmitting the plurality of fragments to the RSM; sending fragments from the RSM to the packet buffer and storing the sent fragments in the packet buffer; sending a first word of a first of the plurality of fragments and a last word of a last of the plurality of fragments from the RSM to the POQ and storing the first and last words in the POQ; accessing, by the POQ, the packet buffer and retrieving therefrom all but the first and last words of the data packet in reverse order, and sending a modified data packet that includes the first word, the last word and the words retrieved from the packet buffer to the physical I/O block for transmission to the network.

The first and last words may be stored in a small table in the POQ and the first and last words may be sent to the physical I/O block for transmission to the network while the accessing and retrieving steps are carried out. The transmitting step to transmit the plurality of fragments to the RSM may be carried out with each fragment including fragment data and an associated fragment address, and the step of storing the sent fragments in the packet buffer may be carried out by storing the fragment data of each fragment in the packet buffer at its associated fragment address. The step of transmitting the plurality of fragments to the RSM may be carried out with the plurality of fragments being out-of-order. The method may further include a step of providing the POQ with a first-in-first-out (FIFO) buffer configured to store packet pointers, each packet pointer being an address in the packet buffer of a packet stored therein and when an outgoing packet is ready to be released to the POQ for transmission to the network, the RSM carries out a step of adding a pointer to the outgoing packet in the packet buffer to a tail of the FIFO in the POQ. The accessing and retrieving steps may include a step of accessing and retrieving a packet stored at an address in the packet buffer pointed to by a packet pointer at a head of the FIFO in the POQ. The network may be a packet switching network that includes a plurality of switch planes and the providing step may provide a separate POQ and a separate physical I/O block for each of the plurality of switch planes, each POQ being coupled to a separate one of the physical I/O blocks and each physical I/O block being coupled to a separate one of the plurality of switch planes. The method may further include a step of making an explicit selection of one of the plurality of switch planes and the POQ may be that POQ that is coupled to physical I/O block that is coupled to the selected switch plane. The method may further include making a wildcard selection of one the plurality of switch planes and the POQ may be that POQ that has a smallest number of data packets waiting to be transmitted to the network.

A still further embodiment of the present invention is a method for transmitting a data packet stored in a memory of a processor to a network. The method may include steps of providing a network adapter, the network adapter including a reassembly state machine (RSM), a packet buffer, a Packet Output Queue (POQ) and a physical I/O block coupled to the POQ and to the network; fragmenting the stored data packet into a plurality of fragments, each including a plurality of words, and transmitting the plurality of fragments to the RSM; sending fragments from the RSM to the packet buffer and storing the sent fragments in the packet buffer; sending a first word of a first of the plurality of fragments and a last word of a last of the plurality of fragments from the RSM to the POQ and storing the first and last words in the POQ; accessing, by the POQ, the packet buffer and retrieving therefrom all but the first and last words of the data packet, and sending the first word, the words retrieved from the packet buffer and the last word to the physical I/O block for transmission to the network.

The first and last words may be stored in a small table in the POQ and the first word may be sent to the physical I/O block for transmission to the network while the accessing and retrieving steps are carried out. Both the first and the last words may be sent to the physical I/O block while the accessing and retrieving steps are carried out. The transmitting step to transmit the plurality of fragments to the RSM may be carried out with each fragment including fragment data and an associated fragment address, and the step of storing the sent fragments in the packet buffer may be carried out by storing the fragment data of each fragment in the packet buffer at its associated fragment address. The step of transmitting the plurality of fragments to the RSM may be carried out with the plurality of fragments being out-of-order. The method may further include a step of providing the POQ with a first-in-first-out (FIFO) buffer configured to store packet pointers, each packet pointer being an address in the packet buffer of a packet stored therein and when an outgoing packet is ready to be released to the POQ for transmission to the network, the RSM may carry out a step of adding a pointer to the outgoing packet in the packet buffer to a tail of the FIFO in the POQ. The accessing and retrieving steps may include a step of accessing and retrieving a packet stored at an address in the packet buffer pointed to by a packet pointer at a head of the FIFO in the POQ. The POQ may retrieve the words of the data packet in reverse order. The network may be or include a packet switching network that includes a plurality of switch planes and the providing step may provide a separate POQ and a separate physical I/O block for each of the plurality of switch planes, each physical I/O block being coupled to a separate one of the plurality of switch planes. A step may be carried out of making an explicit selection of one of the plurality of switch planes and the POQ may be that POQ that is coupled to physical I/O block that is coupled to the selected switch plane. The method may further including making a wildcard selection of one the plurality of switch planes and the POQ may be that POQ that has a smallest number of data packets waiting to be transmitted to the network.

Yet another embodiment of the present invention is a method for transmitting a data packet stored in a memory of a processor to a packet switching network that includes a plurality of switch planes. The method may include steps of providing a network adapter, the network adapter including a reassembly state machine (RSM), a packet buffer, and a plurality of Packet Output Queue (POQ), one POQ being associated with each of the plurality of switch planes; fragmenting the stored data packet into a plurality of fragments, each including a plurality of words, and transmitting the plurality of fragments to the RSM; sending fragments from the RSM to the packet buffer and storing the sent fragments in the packet buffer; storing, by the RSM, a first word of a first of the plurality of fragments and a last word of a last of the plurality of fragments in each of the plurality of POQ; selecting one of the plurality of switch planes; accessing, by the POQ associated with the selected switch plane, the packet buffer and retrieving therefrom all but the first and last words of the data packet to reassemble the data packet, and transmitting the reassembled data packet to the selected switch plane.

The selecting step may include making an explicit selection of one of the plurality of switch planes. The selecting step may be carried out such that the selected switch plane is associated with a POQ of the plurality of POQ having a smallest number of data packets waiting to be transmitted. The providing step may further provide a physical I/O block coupled between each POQ and one of the plurality of switch planes and the transmitting step may include sending the reassembled data packet to the physical I/O block coupled to the POQ associated with the selected switch plane, for transmission to the selected switch plane. The method may further include selecting one of a plurality of paths in the selected switch plane and the transmitting step may include transmitting the reassembled data packet on selected path of the selected switch plane.

BRIEF DESCRIPTION OF THE DRAWINGS

In order to facilitate a more full understanding of the embodiments of the present invention, reference is now made to the appended drawings. These drawings should not be construed as limiting the present invention, but are intended to be exemplary only.

DETAILED DESCRIPTION

The following description of the HPC system, network adapters and associated methods is provided for illustrative and exemplary purposes only, to facilitate an understanding of the significance of the high performance communication capability of embodiments of the present inventions. Other HPC architectures, with which embodiments of the present invention may be practiced, are also within the scope of the claimed embodiments.

Figure 1:
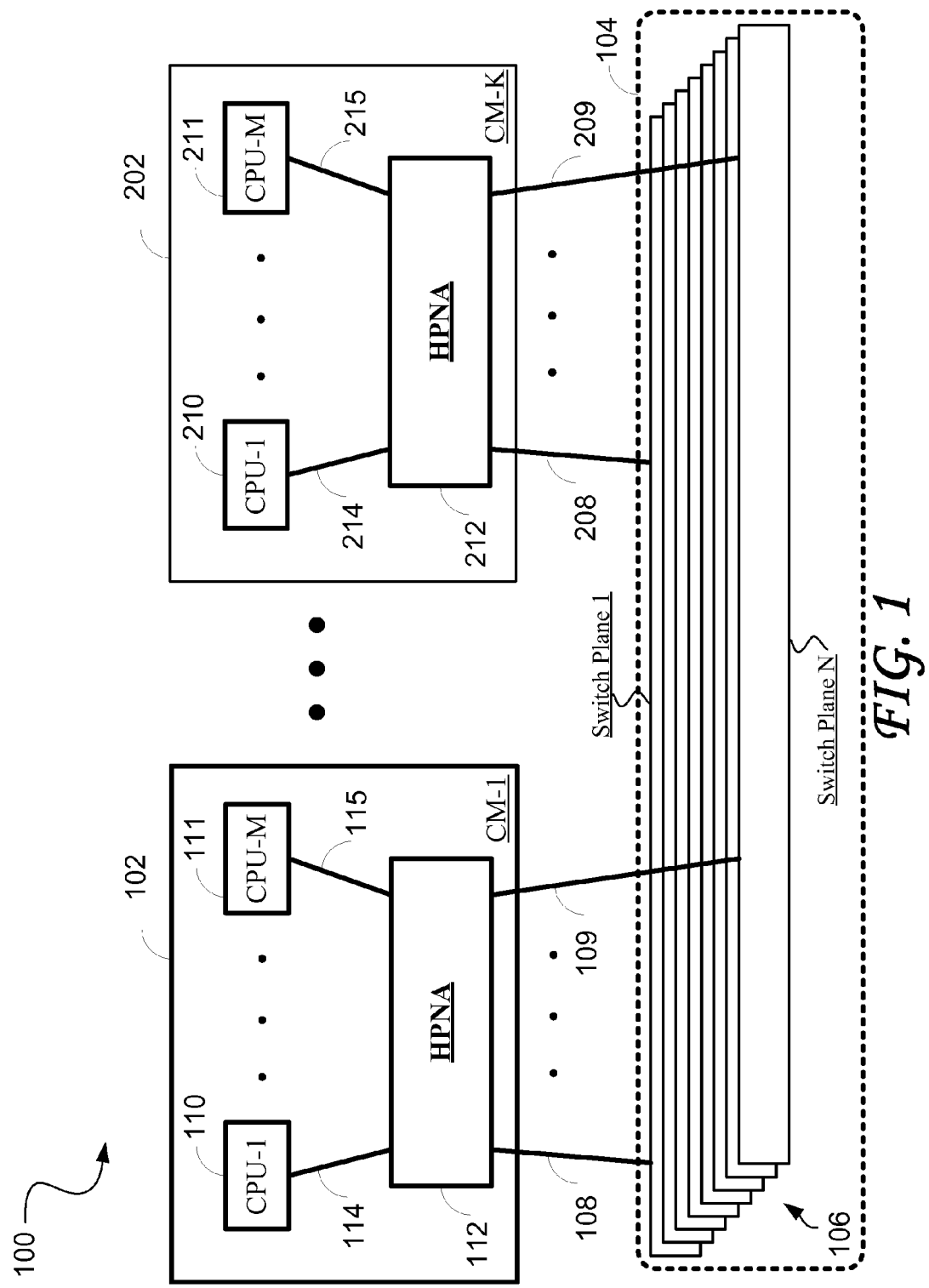
FIG. 1 shows a High Performance Computer System (HPC) 100 including a high performance network adapter (HPNA), according to an embodiment of the invention.

FIG. 1 shows an exemplary High Performance Computer System (HPC) 100 including a high performance network adapter (HPNA), according to an embodiment of the invention. The HPC system 100 includes a plurality K of computing modules 102, 202, ... (CM-1 to CM-K respectively), and a packet switching network 104. The packet switching network 104 may include a plurality N of switch planes 106, numbered 1 to N (Switch Plane 1 to Switch Plane N).

The CM-1 102 may be coupled by a network link to each of the switch planes 106 of the packet switching network 104; that is, a network link 108 to the switch plane 1, a network link 109 to the switch plane N, and additional network links (not shown) to the remaining switch planes. According to one embodiment, each CM (102, 202, ... ) may be coupled to the packet switching network 104 by at least one of the network links to each of the N switch planes.

The CM-1 102 may include a plurality M of processors 110 ... 111 (CPU-1 to CPU-M), and at least one high performance network adapter (HPNA-1) 112 as shown. As shown, each of the processors (110 ... 111) may be coupled to the HPNA-1 112 through a respective processor link 114, 115. Each of the processors (110 ... 111) may be realized as a self contained device, or may be included as a "core" in a multi-core processor.

Each processor may include memory and a memory cache, and each compute module 102, 202 may also include additional memory that is shared among the processors.

The computing module 202 (CM-K) may be configured in a manner that is analogous to the first computing module 102 (CM-1), with M processors 210 ... 211, a high performance network adapter (HPNA-K) 212, and M processor links 214 ... 215 coupling the HPNA-K 212 and the processors 210 ... 211.

Similarly, the CM-K 202 may be coupled by a network link to each of the plurality of switch planes 106 of the packet switching network 104; that is, the CM-K 202 may include a network link 208 coupling the HPNA-K 212 to the switch plane 1, a network link 209 coupling the HPNA-K 212 to the switch plane N, and additional network links (as suggested by the "..." in FIG. 1) coupling the HPNA-K 212 to the remaining switch planes.

Additional computing modules may be similarly configured and coupled to the packet switching network 104.

The high performance network adapter (HPNA 112) may be configured as a dedicated block of hardware and may advantageously be used to decrease packet transmission latency and increase bandwidth between multiple processors (110, 111, ... 210, 211, ... ). Data packets may be sent to the HPNA (e.g. the HPNA 112) from multiple processors (e.g. the CPUs 110 to 111). The processors may break up the data packets into multiple fragments of any length from 1 to W bytes in length (see description of FIG. 4 below of an exemplary data packet, according to embodiments of the present invention). The HPNA may be configured to reassemble the multiple data fragments, received from the up to M processors (CPU-1 to CPU-M) on the CM, into complete data packets. According to embodiments of the present invention, when either the complete packet is received by the HPNA, or a programmable fill level threshold is reached (see flow chart of FIG. 6 below), a pointer to the packet may be sent to a physical interface of one of the network links to start transmitting the packet to one of the N network planes. According to an embodiment of the present invention, the HPNA may begin sending the packet before it is received its entirety (early release), with the expectation that any remaining fragments of the packet will be received in the HPNA from the processor in time, after the first part of the partially re-assembled packet has already left the HPNA towards the network.

At the destination processor (the processor to which the data packet was sent), the receiver block in the receiving HPNA may be coupled to all N planes, and may forward the packet directly into the memory of the destination processor.

According to embodiments of the present invention, if the processor memory is full, the packet may be temporarily stored in the receiving HPNA's internal memory. When the fill level of the HPNA's internal memory reaches a programmable threshold, backpressure may be exerted on the plane, and a backpressure signal may be generated. This backpressure signal may travel back to the source HPNA, which then may halt all traffic on that plane until the backpressure is removed.

The HPNA may reduce the data packet transmission latency using a number of different techniques simultaneously including, for example, the early release method outlined above, and reversing the order of the data in the packet to take better advantage of the memory cache in the destination processor.

The HPC system 100 may also include other modules, that are similar in many respects to the computing modules (102 . . . 202), but serve a different purpose such as, for example to provide system Input/Output (IO) facilities, or mass storage. These other modules may also be coupled with network links to the network 104, and may also include high performance network adapters (HPNAs) according to embodiments of the present invention, as required in order to communicate with the computing modules (102 . . . 202). Furthermore, although for simplicity of the description of the exemplary HPC system 100 it is assumed that each CM may be considered to be similar in construction and in the number of CPUs, it is within the scope of the invention that the HPC system 100 may include CMs of different construction, including a different number or a different type of CPUs.

In the exemplary HPC system 100 shown in FIG. 1, the number of switch planes 106 is N=8, i.e. the packet switching network 104 includes of eight parallel switch planes. However, it is understood that embodiments of the present invention are not limited to being coupled to eight parallel switch planes, as other numbers of switch planes may readily be implemented. That is, the number of switch planes may be reduced or increased, as those of skill in this art will readily recognize.

According to an embodiment of the HPC system 100, the processor links are packet links according to the HyperTransport (HT) protocol and the network links are packet links according to the Infiniband (IB) protocol. Other types of packet links, including optical links and links operating with other protocols, may also be implemented.

The packet switching network may, for example, be implemented as an Infiniband switch. The packet switching network, however, may include a different technology or may have a different topology including, for example, switching networks in which each CM 102 is coupled to only some of the planes, multi-stage switches, and switching networks whose architecture is not based on switch planes.

Suitable Methods and systems for scalable interconnect are described in co-pending and commonly assigned Ser. No. 11/530,410, filed Sep. 8, 2006, and a suitable high performance memory mapped communications interface is described in co-pending and commonly assigned Ser. No. 11/535,258, filed Sep. 26, 2006, both applications of which are hereby incorporated herein by reference in their entireties.

In the exemplary HPC system 100 shown in FIG. 1, all computing modules 102 . . . 202 are configured identically, but that need not be the case. Every processor (CPU-1 to CPU-M) in each computing module 102 . . . 202 (in any of CM-1 to CM-K) may have one or more possible communications paths available to every other processor in the system. In some cases, the communicating processors may be located within the same computing module, and local busses or inter-processor links (not shown) may be used for communications therebetween, instead of the switching network 104. In the general case however, where communicating processors are located in different computing modules, communication is carried out via the packet switching network 104. But for all processors, even between processors located in the same computing module, communication may be over any of the switch planes 106 of the packet switching network 104, and within each plane, over any one or more possible paths through the selected switch plane 106.

Each of the HPNAs (112 . . . 212) may be coupled through the corresponding processor links (114 . . . 115 and 214 . . . 215) to the M processors (110 . . . 111 and 210 . . . 211) in each respective compute module (CM-1 to CM-K), and through the network links (108 . . . 109 and 208 . . . 209) to the N switching planes 106, and provide connectivity between the respective processors and the packet switching network 104.

In terms of functionality, every processor may be provided with the capability to send data packets to every other processor in the HPC system 100 over a number of redundant paths. The HPNAs may be configured as hardware components for routing each data packet over a dynamically or statically determined one of the redundant paths, from any originating processor to any selected switching plane, and from that switching plane to any destination processor. Routing of the data packets may be carried out on the basis of a destination address in the header of each packet.

Figure 2:
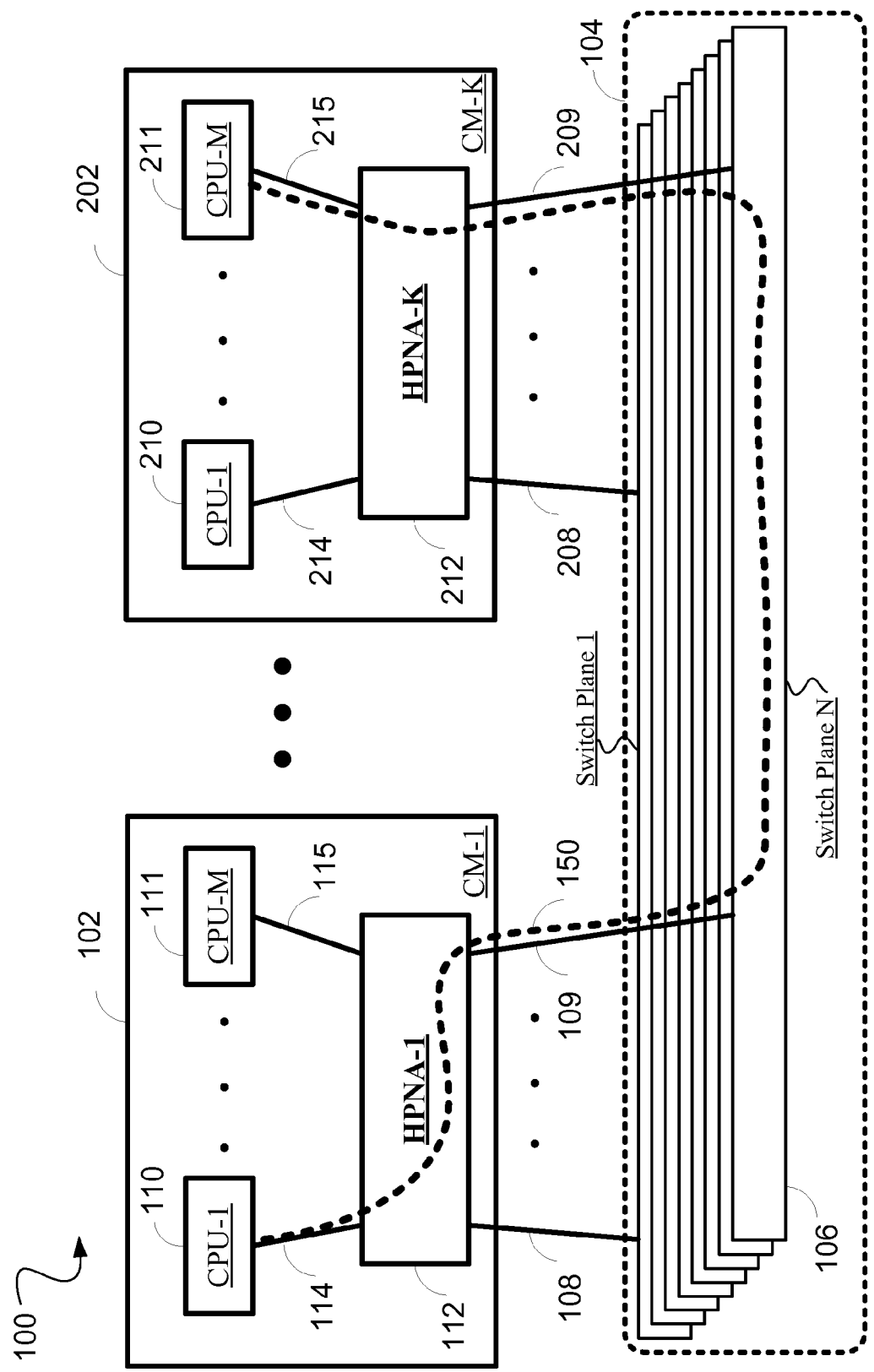
FIG. 2 shows the HPC system 100 of FIG. 1, illustrating a typical processor to processor path 150.

FIG. 2 shows the HPC system 100 of FIG. 1, illustrating a processor to processor path 150, according to an embodiment of the present invention. The processor to processor path 150 extends from the processor 110 (CPU-1) in the compute module 102 (CM-1) to the processor 211 (CPU-M) in the compute module 202 (CM-K), via: the processor link 114; the HPNA-1 (112); the network link 109; the Switch Plane N (106); the network link 209; the HPNA-K (212); and finally the processor link 215.

The following is a description of a design and functionality of the HPNA-1 (112) that is representative of an embodiment of the invention.

Figure 3A:
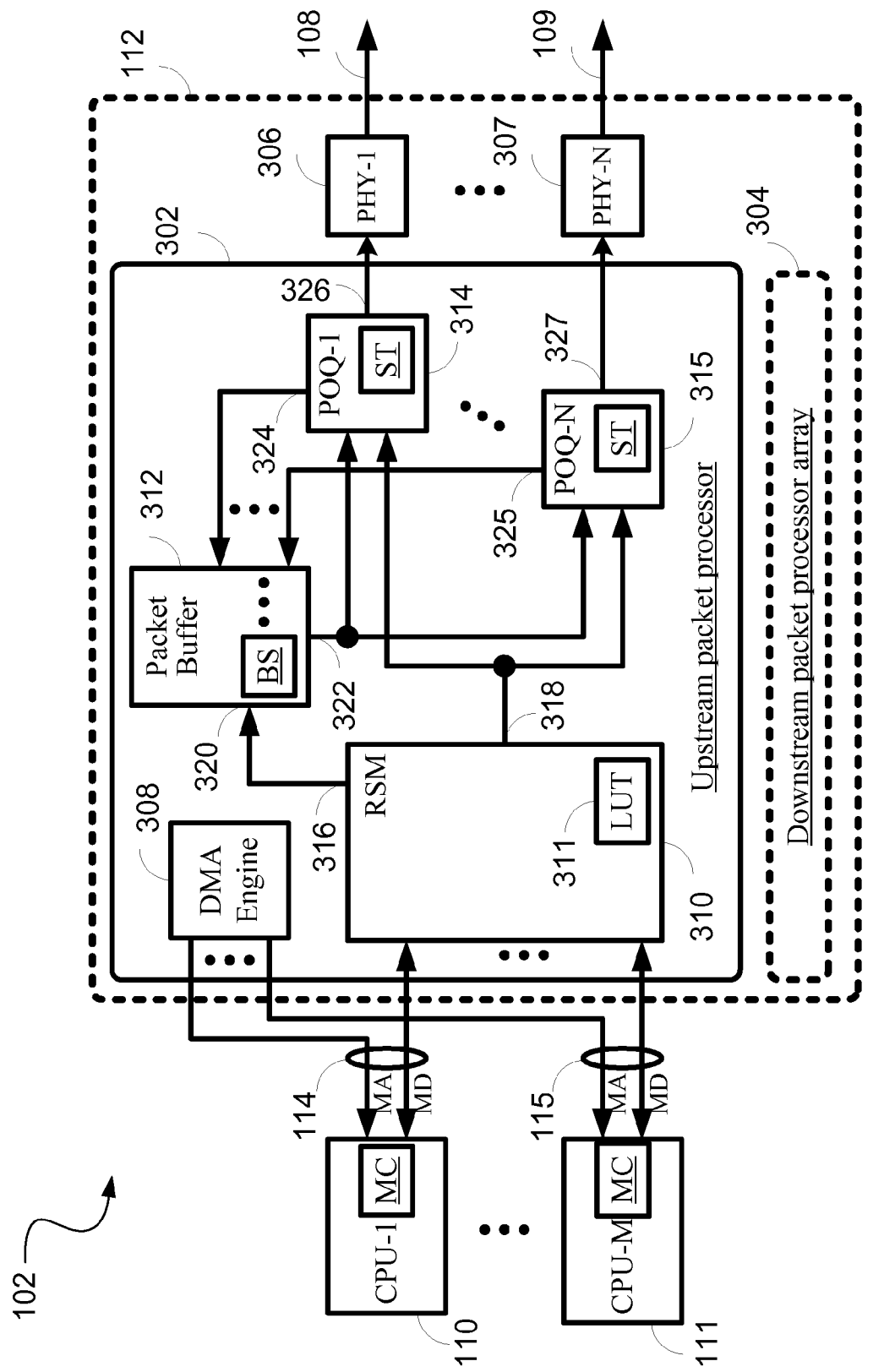
FIG. 3A shows a block diagram of the Compute Module (CM) 102 of FIG. 1, including the processors 110, 111, ... (CPU-1 to CPU-M), and the HPNA 112 comprising an upstream packet processor 302 and a downstream packet processor array 304.
Figure 3B:
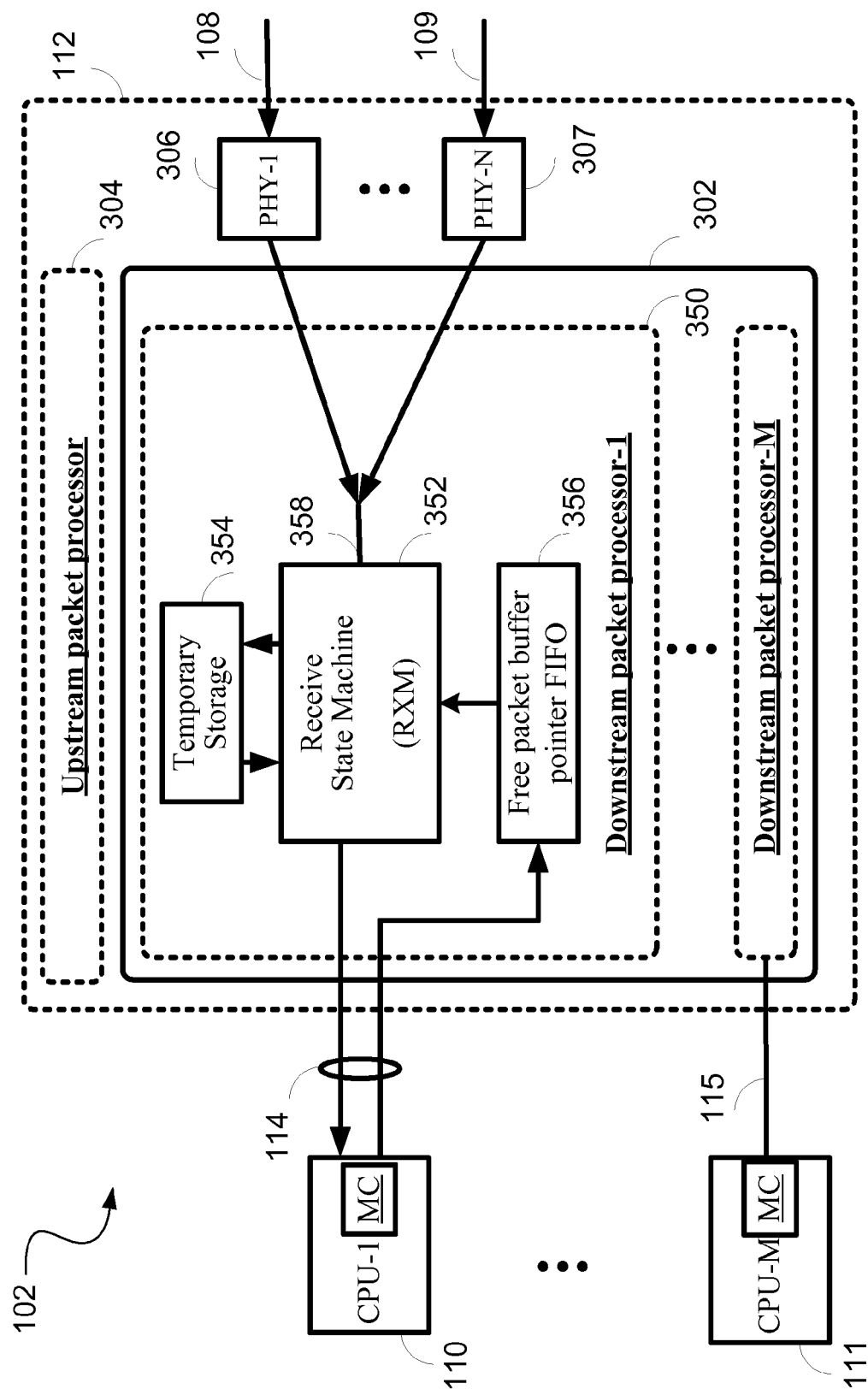
FIG. 3B shows the block diagram of the CM 102 of FIG. 3a, in which the downstream packet processor array 304 is shown in greater detail, according to an embodiment of the present invention.

FIGS. 3A and 3B show a block diagram of the CM 102, including the processors 110 . . . 111 (CPU-1 to CPU-M), and the HPNA 112, according to an embodiment of the present invention. The HPNA 112 may include an upstream packet processor 302, a downstream packet processor array 304 and a plurality N of physical I/O blocks, denoted herein as "PHY". Two representative Phys 306 and 307 (PHY-1 and PHY-N) are shown in FIGS. 3A and 3B, outputting data packets to and receiving data packets from the network links 108 and 109 respectively.

For clarity of illustration, details of the upstream packet processor 302 and shown in FIG. 3A, and details of the downstream packet processor array 304 are shown in FIG. 3B.

According to an embodiment of the present invention, the upstream packet processor 302 may include a Direct Memory Access (DMA) engine 308; a Reassembly State Machine (RSM) 310 including a look-up-table (LUT) 311; a Packet Buffer 312 having a finite number of buffer spaces (BS); and a plurality N of Plane Output Queues (POQ-i, where i=1 to N), of which POQ-1 and POQ-N are depicted in FIG. 3A. Each Plane Output Queue 314 . . . 315 (POQ-1 to POQ-N) may include a small table (ST).

As shown in FIG. 1, the processors 110 and 111 may be coupled to the HPNA 112 through the processor links 114 and 115 respectively. Each processor link (114 . . . 115) may include a memory address (MA) and a memory data (MD) component.

The MA component of each processor link (114 ... 115) couples the DMA Engine 308 to the respective processor, and the MD component of each processor link couples the processor to the RSM 310.

The processors 110 and 111 may include an internal memory controller (MC) to provide an interface between the CPU core and the local memory (not shown) of each processor, and to the processor links 114 and 115, respectively.

The RSM 310 has two outputs, a data fragment output 316 and a "First and Last Word" output 318. The data fragment output 316 is coupled to a write input 320 of the Packet Buffer 312, and the "First and Last Word" output 318 is coupled to a first input of each Plane Output Queue 314 ... 315 (POQ-1 to POQ-N). A data output 322 of the Packet Buffer 312 is coupled to a second input of each Plane Output Queue 314 ... 315 (POQ-1 to POQ-N). The LUT 311 and the STs in the Plane Output Queues are used in the operation of the RSM 310 which will be described in more detail below, relative to FIGS. 6 and 7.

The Plane Output Queues 314 ... 315 (POQ-1 to POQ-N) each have address outputs 324 ... 325, respectively, that are coupled to corresponding address inputs of the Packet Buffer 312.

The Plane Output Queues 314 ... 315 (POQ-1 to POQ-N) are each coupled to the Phys 306 ... 307 (PHY-1 to PHY-2) through transmit outputs 326 and 327 respectively.

Each of the processors (110 ... 111) may simultaneously send data packets into the HPNA 112, for queuing and subsequent transmission on any of the network links 108 ... 109.

As an example, the processor 110 (CPU-1) may have a data packet to send to a destination CM via the switch plane N over the network link 109. According to embodiments of the present invention, the data packet may be read directly from the memory of the processor 110 using the DMA 308 to address the memory in the processor 110 over the MA component of the processor link 114. The read packet may then be fragmented for transmission over the processor link 114, the data being read sequentially as individual memory fragments, each memory fragment (fragment) comprising a number of memory words, over the MD component of the processor link 114, and reassembled as a contiguously stored packet in the Packet Buffer 312 as follows: the memory fragments received by the RSM 310 are sent through the data fragment output 316 to the write input 320 of the Packet Buffer 312. Each data fragment that was requested by the DMA 308 arrives in a data packet that includes fragment data and a fragment address for storing the fragment data in the packet buffer at the fragment address. In this way, it does not matter in which order the fragments arrived as they will be stored in the correct address.

The first and last words of the data packet, i.e. the "first word" of the first memory fragment and the "last word" of the last memory fragment of the data packet, are also forwarded to be stored in the small tables (ST) of each of the Plane Output Queues POQ-1 to POQ-N (314 ... 315).

The data fragments are reassembled, i.e. stored in appropriate sequential order, in the Packet Buffer 312 by the RSM 310. The ability of the HPNA 112 to accept data fragments from the processors (110 ... 111) in any order contributes to improved efficiency and reduced latency: by accepting fragments out of order in the HPNA 112, each processor is allowed to send data at the fastest rate possible. If the first few fragments are in a portion of memory that is busy, fragments from other banks of memory that are idle may be read and sent to the HPNA earlier. In the simplest case, the Reassembly State Machine (RSM) 310 may only release the data packet to one of the POQs for transmission to the network when the entire packet has been received and reassembled. The length of the packet is retrieved by the RSM 310 from the header in the first word of the data packet.

The HPNA 112 is configured to receive and processing fragments from multiple processors simultaneously. Indeed, the RSM 310 may be configured to simultaneously reassemble up to P packets, P being the maximum number of packets that can be stored in the Packet Buffer 312. The RSM 310 may be configured to continue to accept new packets, until all available buffer spaces in the Packet Buffer 312 are used up. The fill level of the Packet Buffer 312 must be monitored by software on the processors (110 ... 111) before sending any new packets to the HPNA 112.

When the data packet is fully received from the processor 110 and assembled in the Packet Buffer 312, the RSM 310 releases the packet to one of the POQs (314 ... 315) for transmission over the corresponding phy (306 ... 307) and the corresponding network link (108 ... 109) to the corresponding switch plane 106 (see FIG. 1).

Included in each POQ is a first-in-first-out (FIFO) buffer of packet pointers, each packet pointer being the address in the Packet Buffer 312 of a packet. According to an embodiment of the present invention, when a packet is released to the POQ by the RSM 310, the corresponding packet pointer is added at the tail end of the packet pointer FIFO. The packet pointer at the head of the packet pointer FIFO points to the packet that is presently being transmitted from the POQ to the corresponding phy. To transmit a packet, the POQ transmits the first and last words of the packet, these two words having been placed into the small table (ST) of the POQ during the reassembly process by the RSM 310. In the mean time, the POQ outputs the packet pointer that is at the head of the packet pointer FIFO over its address output 324 to the Packet Buffer 312 and reads from the data output 322 of the Packet Buffer 312 the words of the packet that is pointed to by the packet pointer. By combining the packet pointer with a word offset, individual words of the packet are accessed and retrieved. The word offset starts with a value representing the last (or last-1) word in the packet, and is decremented sequentially to 0 (or 1) to retrieve all words of the packet and forwarding them to the phy, thus transmitting the packet in reverse order.

By sending the first and last words from the small table (ST) of the POQ immediately upon release of the packet by the RSM 310, latency is improved by the two clock cycles in the preferred embodiment of the invention. Two clock cycles are needed to access the packet buffer from the POQ and read a data word for transmission. These two clock cycles are not wasted (and thus do not contribute to latency) by having already two words (the first and last words) stored and ready to be sent in the POQ.

The RSM 310 may optionally determine the network plane from the packet header, to select the POQ to which the packet should be released. The packet header contains a destination address field; if the destination address of a packet contains an explicit switch plane selection, the RSM 310 uses the switch plane that was selected by the processor as indicated in the packet header and releases the packet to the appropriate POQ. But if the destination address field contains a "wildcard" value for the switch plane selection, then the RSM 310 chooses a switch plane based on the number of packets waiting in the FIFOs of the POQs. The "wildcard" value for this purpose may be an all-1s pattern for example, or another out-of-range value that does not represent a particular switch plane.

The RSM 310 may thus select the switch plane based on an evaluation of the number of packets waiting in the POQs associated with each switch plane that is the fill level (the number of packet pointers stored) of the packet pointer FIFO of each POQ. When the fill level of the packet pointer FIFO reaches a programmable threshold, the RSM 310 selects the POQ with the lowest FIFO fill level. If multiple packet pointer FIFOs have the same lowest fill level, or if the fill level of no packet pointer FIFO has reached the programmable threshold, the RSM 310 may round robin between POQs whose FIFOs exhibit the lowest fill level. This selection may be carried out for each packet that is released from the RSM 310 to one of the POQs. This method of switch plane selection is designed to make use of all switch planes efficiently, replenishing the packet pointer FIFOs with the lowest fill level first; other methods of switch plane selection, also within the scope of the invention, may be contemplated in which for example, packet priority, packet type, and/or other criteria may be included in the selection.

In addition to a traffic scheduling strategy that is aimed at maximizing throughput as described above, an important alternative or optional strategy, according to an embodiment of the present invention, is sticky plane selection. In this method, the traffic to a given destination is allowed to stay in the currently selected plane until a preconfigured High Traffic Load Threshold is reached on this plane and a second plane is under a preconfigured Low Traffic Load Threshold. In this case, the traffic to the given destination is sent towards this same destination via the second plane and again the selection is sticky. The main objective of the sticky plane selection strategy is to maximally maintain packet order towards one destination within a multi-plane network fabric. This is important to certain traffic protocols such as TCP/IP, which is very sensitive to packet arrival order. Even though the TCP implementation allows for reordering of packets at reassembly, this entails a significant performance penalty. By choosing the sticky plane selection method according to embodiments of the present invention, a significant bandwidth improvement was obtained in experiments with TCP/IP traffic.

According to an embodiment of the present invention, after the RSM 310 releases the data packet for transmission to the selected POQ (for example the POQ-N 315), the POQ-N may read the words of the data packet stored in the Packet Buffer 312 in a special reverse order, and in combination with the first and last words already stored in the POQ-N 315, transmits a modified packet (see FIG. 5 for a description of a modified packet) through the corresponding transmit output 327 to the PHY-N 307 which in turn sends it to the switch plane N over the network link 109. Having received the first and last "words" of the packet from the RSM 310 initially, the POQ-N 315 is able to start transmitting the modified packet immediately while waiting to access the Packet Buffer 312 for the remaining "words" of the packet, thus saving time and reducing latency.

A small part of the data of each packet (specifically the first and last words) may be stored in the small table ST within every Plane Output Queue (including the POQ-N 315 in the example developed above) of the HPNA 112. This reduces latency when transmitting from the Plane Output Queue to the associated phy (PHY-N 307 in our example), since the first two words (the first and last words) of the modified packet (see FIG. 5 below) can be sent to the phy, while the rest of the modified packet is being retrieved from the Packet Buffer. This technique reduces the latency by two clock cycles because the first two words to be transmitted may already be moved from the small table (ST) into an output buffer in the Plane Output Queue at the time the modified packet is released for transmission by the RSM 310 (see FIG. 6 below).

The downstream packet processor array 304 according to an embodiment of the present invention is shown in more detail in FIG. 3B. The downstream packet processor array 304 may include a plurality M of downstream packet processors 350, and each downstream packet processors 350 may be individually associated with a corresponding one of the plurality of M CPUs. Each downstream packet processor 350 may be configured to receive packets from any of the plurality N of phys (PHY-1 to PHY-N, 306 . . . 307) and may forward the packets to the associated CPU. According to embodiments of the present invention, the downstream packet processors 350 may be configured to direct packets arriving over any one of the phys (PHY-1 to PHY-N) destined for any CPU-i (i=1 to M) to the associated downstream packet processors-i (i=1 to M), and thus may allow each downstream packet processor-i to receive packets from any of the phys (PHY-1 to PHY-N). The design of the downstream packet processor 350 may include commonly used high-speed circuit techniques to permit concurrent processing of multiple (up to N) simultaneous packet streams. To simplify the description that follows, it is assumed that only one packet is received by the downstream packet processor 350, it being understood that concurrently arriving packets from up to N network links may be processed concurrently.

The downstream packet processor 350, according to embodiments of the present invention, may include a Receive State Machine (RXM) 352; a Temporary Storage 354 coupled to the RXM 352; and a Free Packet Buffer Pointer FIFO 356. A packet input 358 of the RXM 352 is coupled through a multiplexer (not shown) all N phys (PHY-1 to PHY-N) for receiving packets from all N switch planes.

According to an embodiment of the present invention, the downstream packet processor 350 operates in cut-through mode, and the data of each packet that is received from the Phy (for example the PHY-1 306) at the packet input 358 is immediately transmitted to the associated processor (the processor CPU-1 in this example) and stored in the memory of the processor. This reduces the latency at the receive end to an absolute minimum. One or more pointers to free packet buffers in the processor memory are provided by the processor to the Free Packet Buffer Pointer FIFO 356 of the RXM 352. When a packet is received, the RXM 352 obtains a current packet buffer pointer from the Free Packet Buffer Pointer FIFO 356 and stores the received packet into the packet buffer pointed to by the obtained current packet buffer pointer. In another operational mode, for example with Remote Direct Memory Access (RDMA) a buffer for receiving the packet may have been previously reserved in the memory of the destination processor (the processor CPU-1 in this example) into which the packet may be written without use of the Free Packet Buffer Pointer FIFO 356.

When the complete packet has been received, the RXM 352 notifies by interrupt, flag-bit, or any other method, the software in the processor and releases the current packet buffer pointer. For each received packet, a packet buffer pointer is thus removed from the Free Packet Buffer Pointer FIFO 356. It is the responsibility of the processor to return free packet buffer pointers to the Free Packet Buffer Pointer FIFO 356 before the Free Packet Buffer Pointer FIFO 356 becomes empty.

As long as the Free Packet Buffer Pointer FIFO 356 is not empty, the RXM 352 has at least one address of a space that has been reserved by software in the processor memory, and can immediately forward each fragment, including the first arriving fragment, of a packet arriving from the phy, even before inspecting the header of the packet. The Temporary Storage 354 may be used to hold the first word (the "First Word" of a modified packet arrives first, and also contains the packet header, see FIG. 5 below) of a received packet. Recall that packets are sent in a special reverse order (see FIG. 4 below for details). However, it is desired that the packets are stored in normal order in the packet buffer of the processor memory at the receiving end. The first word of the packet received includes the length of the received packet, and thus allows the RXM 352 to determine at what address, that is at the correct offset from the address given by the free packet buffer pointer, to store the fragments of the packet as they are received. The first word is held in the Temporary Storage 354 until the remaining words of the first fragment are received, i.e. at the end of the packet that is received in the special reverse order (see FIG. 5 below).

According to another embodiment of the HPNA 112, the downstream packet processor 350 may be associated with two or more CPUs, up to M CPUs in which case packets are received by the RXM 352 from all N switch planes (as before), processed, and then may be forwarded to any of the associated CPUs. The "array" of downstream packet processors is thus reduced to a single downstream packet processor which, at its packet input 358, multiplexes packets arriving from all switch planes, and is equipped with a demultiplexer (not shown) to send each received packet to the associated CPU, in a time-multiplexed manner.

It is to be noted that embodiments of the HPNA that include an array of downstream packet processors (as shown in FIG. 3B) achieve the lowest latency in forwarding received packets to the CPUs. Alternative embodiments that include a single downstream packet processor may reduce the amount of hardware and associated power dissipation, at the expense of a very small increase in latency, due to the demultiplexer.

Figures 4, 5:
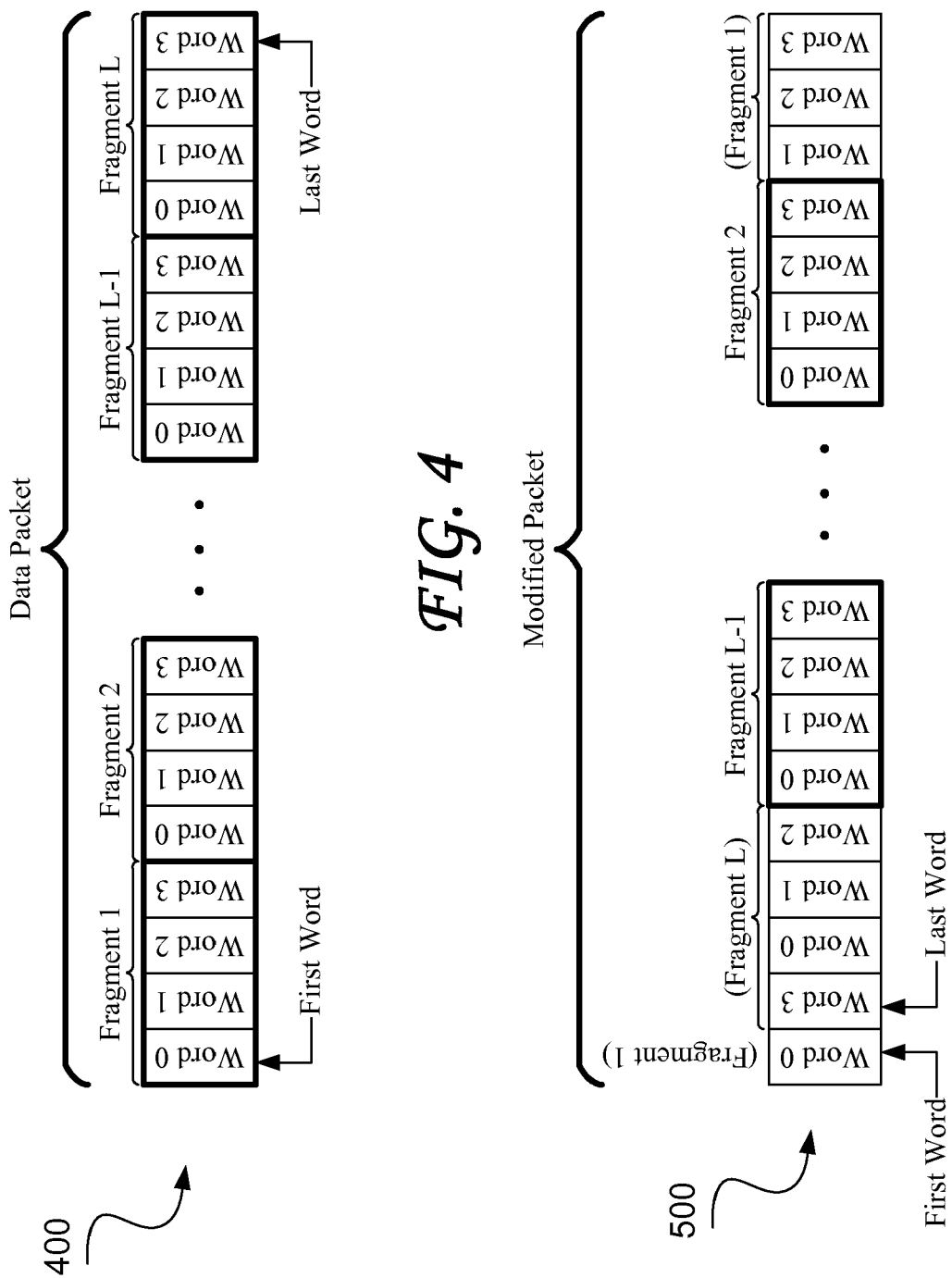
FIG. 4 shows an exemplary reassembled data packet 400, according to an embodiment of the invention.
FIG. 5 shows a modified packet 500, according to an embodiment of the invention.

FIG. 4 shows a reassembled data packet 400 that is stored in the Packet Buffer 312 and that is destined for any one of the network links (108 . . . 109), according to an embodiment of the present invention. The reassembled data packet 400 includes "L" memory fragments ("fragments") numbered 1 to L. In the example shown in FIG. 4, each fragment is composed of four "words" numbered word-0 to word-3. A fragment may consist of, for example, 1 to 64 or more bytes, and the number of bytes in a "word" may be any value from 1 to 16 bytes or more, and may be selected to coincide with the word length or the bus width of the processor, or to suit the packet protocol. For example, in a so-called "64-bit" processor with a 128-bit wide memory bus, the size of a "word" may conveniently be selected as 8 (eight) or 16 (sixteen) bytes. The size of a fragment may be chosen to be compatible and perhaps optimal for the transport protocol used on the processor links, for example 4 (four) words, as depicted in the illustration of FIGS. 4 and 5.

The first and last words of the data packet, i.e. the word 0 of the fragment 1, and the word 3 of the fragment L are labeled "first word" and "last word" respectively. These two words are sent directly to all Plane Output Queues. The "first word" of a data packet typically includes the packet header, or at least the part of the packet header that contains the length of the packet and the destination identifier (destination id) that identifies the processor to which this packet is to be sent through the packet switching network. As described earlier, the data packet may be received by the HPNA 112 from the processor fragment by fragment, arriving in any order, and upon arrival may be reassembled in a buffer space of the Packet Buffer 312 in its natural order.

FIG. 5 shows a modified packet 500, corresponding to the data packet 400, showing the transmission order of the words of the modified packet 500 leaving the Plane Output Queue 315, according to an embodiment of the present invention.

Assuming the data packet 400 includes L fragments, L being four or greater in this example, the order of transmission is as follows:
   word 0 of fragment 1 (the "first word" of the data packet 400);
   word 3 of fragment L (the "last word" of the data packet 400);
   words 0, 1, and 2 of fragment L;
   words 0, 1, 2, and 3 of fragment L-1;
   . . .
   words 0, 1, 2, and 3 of fragment 2;
   words 1, 2, and 3 of fragment 1.

Note that all fragments are transmitted in normal word order, but the modified packet is transmitted in reverse fragment order, with the exception that the "first word" and the "last word" are transmitted at the start of the modified packet and then skipped where they would have occurred had they not been sent already.

Sending the modified packet 500 (i.e. the original packet 400 in reverse order) is done so that the data will be written at the destination (i.e. the processor 211 in the CM 202 at the endpoint of the path 150 of FIG. 2 for example) into the processor's data buffer in reverse order. Most types of modern processors are coupled to their local memory through a memory controller that includes internal buffers. Each memory controller (MC, see FIGS. 1, 3A and 3B) provides an external interface (e.g. the processor links 114, 115) to which the HPNA may be coupled. Note that the packet may be written into the processor memory by the HPNA directly through the memory controller, bypassing the CPU processing core. Thus by writing data into the memory in reverse order, the last data written into memory may in fact still be stored in the buffers of the memory controller when the receive processor (the CPU core) reads the packet from memory. The packet header that is contained in the first fragment of the packet may thus be read quickly with from the buffers in the memory controller where this data is still available since it was the last data written to memory. The complete received packet may subsequently be read and processed by an application process. While writing the words of the modified packet into the destination memory, the correct addresses are used such that the packet will appear in its normal order. The receiving processor (the application process for example) reads the packet in normal order from the first byte to the last byte.

The special treatment of the first word of the data packet which is sent ahead of the reverse ordered fragments in the modified packet, is necessary so that the packet header is received by the network and the destination CM (the CM-K 202 for example, FIG. 2) and can be inspected to route the packet to the destination CPU (the CPU-M 211 for example). The first word also carries the length of the packet which may allow the destination CM to reserve a receive buffer space of the necessary size, or determine the offset of the last word (which will be received next) in the buffer. The receiving HPNA holds the received first word in a register until the fragment1 (see FIG. 5) is received. Note that the word0 of the fragment1, having already been sent, is not sent again as part of fragment1; rather, before sending the fragment 1 to the destination CPU, the HPNA combines the word0 (having been temporarily held in a register) with the fragment1 for delivery to the CPU.

Early Release

A significant latency improvement may be achieved by "Early Release" of larger packets by the HPNA for transmission to the network 104. What has been described so far resembles a store and forward mode of operation in which a complete packet is received from the processor (i.e. CPU-1, etc) in the HPNA, and forwarded only to the network 104 after it has been completely received in the packet buffer of the HPNA.

It is to be noted that very short packets (packets containing only 2 words, the first and the last word), may be sent immediately through the POQ without needing to be reassembled in the packet buffer.

For intermediate size packets, the store and forward mode as described above may be advantageous, in which the data packet 400 is brought for reassembly into the Packet Buffer 312 in fragments in any order, and then transmitted as the modified packet 500 in reverse order.

When moving large blocks of data between processors, the DMA 308 contained within the HPNA 112 transfers large blocks of data from the processor memory to the HPNA 112 in small fragments. Considering that the HPNA 112 is capable of receiving fragments from the processor in any order, these fragments may be requested by the DMA 308 in reverse order, this order being the same order in which the packet will be transmitted to the Plane Phy. In this way, it was found to be advantageous to allow the RSM 310 to release the packet to the Plane Output Queue (i.e. POQ-1, etc) before the complete packet has been received in the Packet Buffer 312. In other words, transmission of the packet from the HPNA 112 to the network 104 is overlapped with its transmission from the processor. Transmission of the packet to the network 104 starts before the whole packet has been received from the processor, thus overlapping in time the transmissions of the packet on the processor link and on the network link.

A water mark is defined as a fill level of the Packet Buffer 312 at which a partially assembled packet may be released to the POQ. The water mark is programmable and may be adapted dynamically to be as low as possible without occurring buffer underflow. A buffer underflow error would occur when the next packet fragment to be forwarded by the POQ to the phy is not yet available in the Packet Buffer 312. Each time such an error occurs, the water mark is increased. The maximum level of the water mark is 100% of the packet length, at which point the RSM 310 would be running in store and forward mode. The DMA engine 308 may request fragments individually in reverse order, and the processor link protocol may only allow a limited number F of outstanding fragments (e.g. F=8). Accordingly, the first F fragments may arrive before the next F fragments are requested by the DMA 308. If the water mark is then set to a number slightly greater than F (for example, 12 fragments), it should be possible to release the first F fragments. In the time the F fragments are transmitted on the network link, the next few (for example F) fragments would be received in the Packet Buffer 312 before they are required by the POQ for continuing the transmission of the packet without interruption.

If the water mark is set too low, and a buffer underflow error occurs, the current incomplete packet is marked as in error by setting a bad error-check in the packet, and its length that is indicated in the header will be incorrect. This will cause the receiver of the error packet to discard the packet. In the mean time, the sender, having adjusted its water mark, sends the packet again. The water mark can be set in software to an initial value (such as 12), and will be increased automatically in the HPNA 112 hardware whenever errors occur. It can be re-set to a lower value again by software if no or very few errors have been observed. In this way, the watermark may be set dynamically to a value which allows the earliest release of packets (reducing the average latency) while causing very few errors that result in packet retransmissions (which would add to the average latency), until a setting is achieved that may be optimal.

When receiving the modified packet 500, the downstream packet processor 350 (see FIG. 3B), holds the "First Word" in the Temporary Storage 354 until the complete Fragment 1 (i.e. Words 1, 2, and 3 of the Fragment 1) has been received at the end of the modified packet 500, before it forwards the complete Fragment 1 to the processor over the processor link 114.

Figure 6:
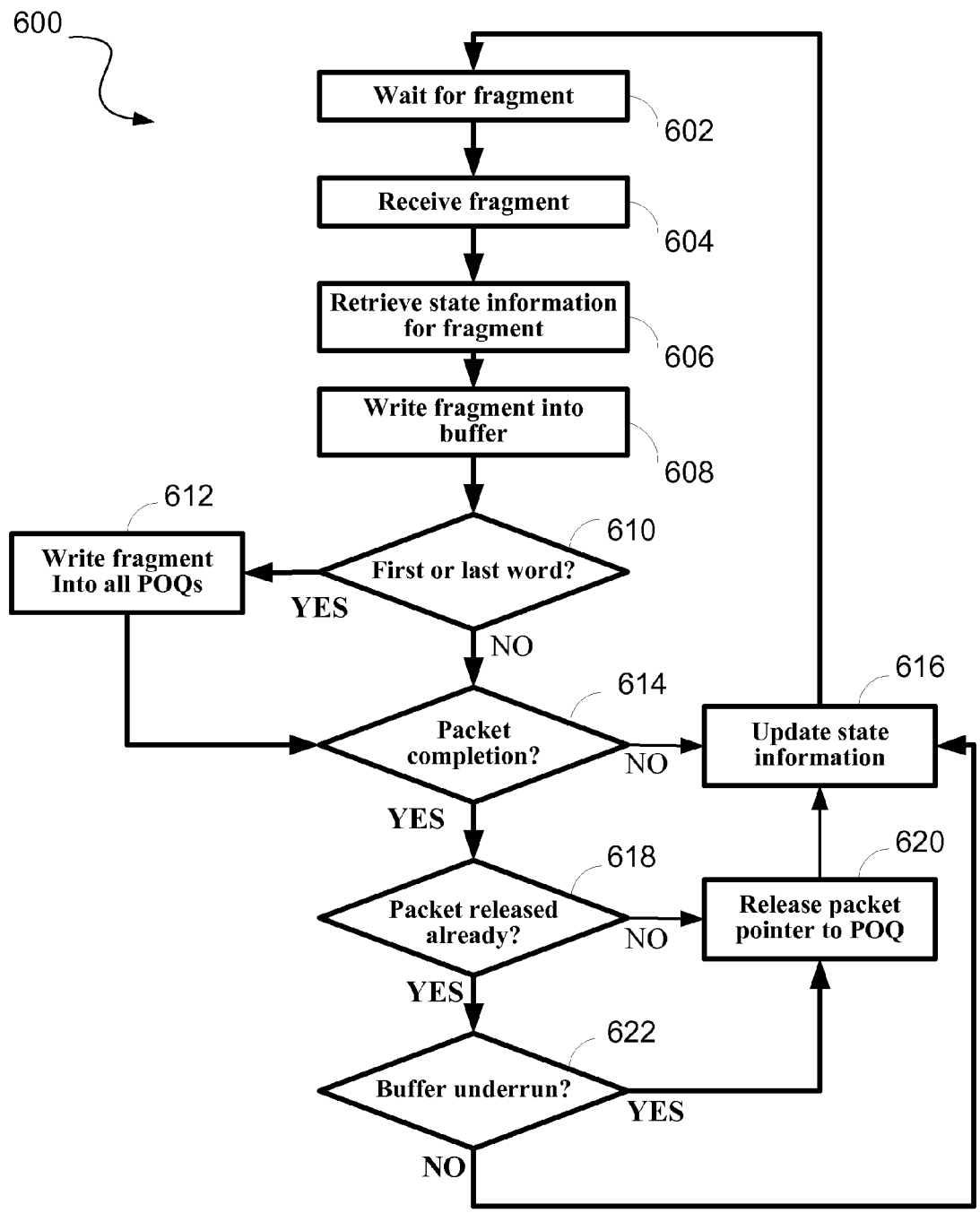
FIG. 6 shows a flow chart of a packet transfer method 600 of the RSM 310 of FIG. 3A, according to an embodiment of the present invention.

FIG. 6 shows a flow chart of a packet transfer method 600 of the RSM 310 (FIG. 3a), for controlling the reassembly of fragments into the Packet Buffer 312, and the release of the packet into the Plane Output Queue (POQ-N 315 for example). The steps of the packet transfer method 600 are:

602 "Wait for fragment";
604 "Receive fragment";
606 "Retrieve state information for fragment";
608 "Write fragment into buffer";
610 "First or last word?";
612 "Write fragment into all POQs";
614 "Packet completion?";
616 "Update state information";
618 "Packet released already?";
620 "Release packet to POQ"; and
622 "Buffer underrun?".

In the step 602 "Wait for fragment", the RSM 310 waits for any fragment to arrive from any processor (CPU-1 to CPU-M) over the associated processor link (114 . . . 115). The step "Wait for fragment" 602 is executed continuously until a fragment arrives.

In the next step 604 "Receive fragment", a fragment is received, and in the following step 606 "Retrieve state information for fragment" information for the received fragment is retrieved from the LUT 311 in the RSM 310, FIG. 3a.

Before continuing the description of the packet transfer method 600, it is appropriate to introduce the information that is stored in the look up table (LUT) 311.

Figure 7:
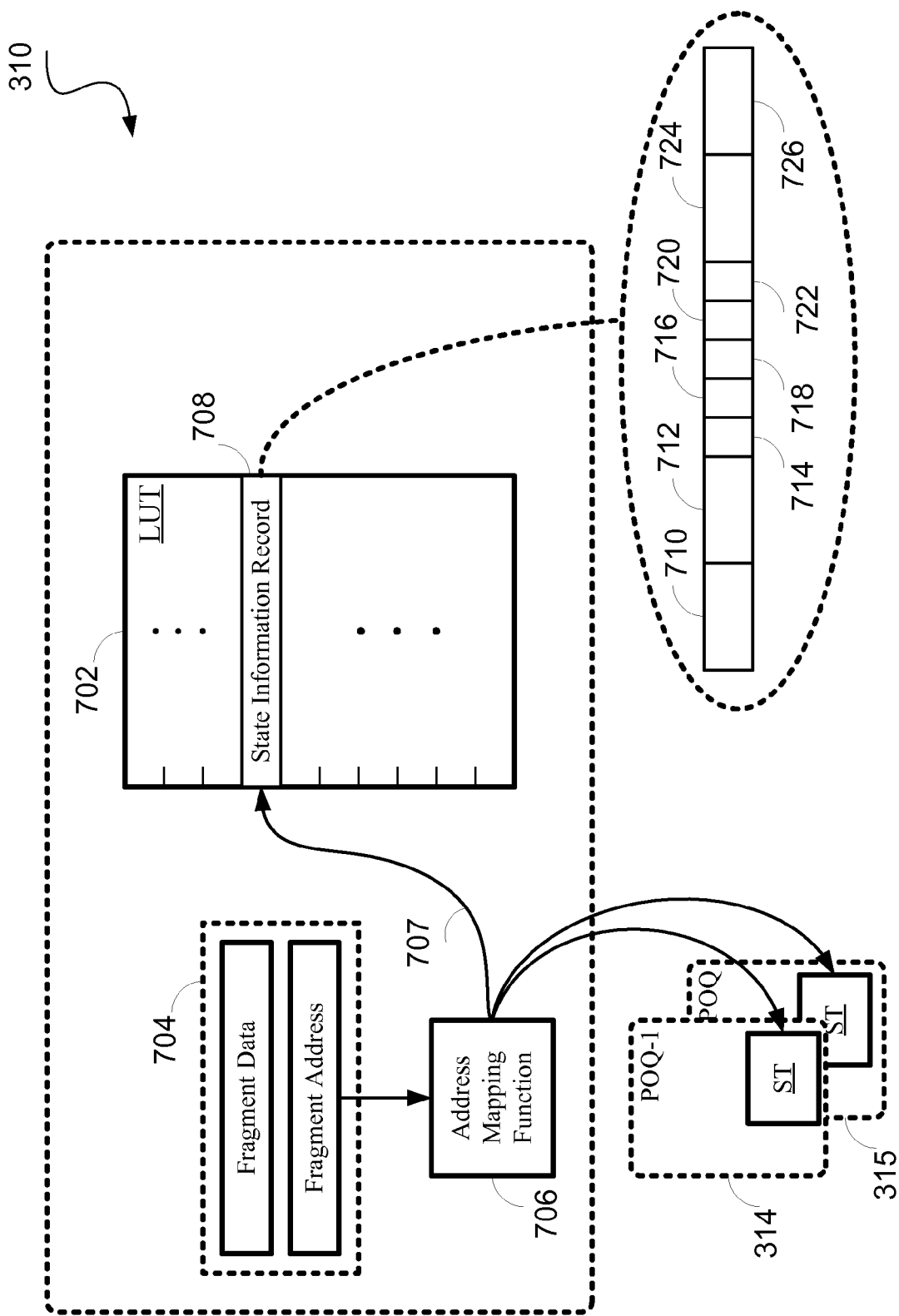
FIG. 7 shows a diagram illustrating a State Information Look-Up Table (LUT) 702 of the RSM 310 of FIG. 3A, according to an embodiment of the present invention.

FIG. 7 shows a diagram illustrating components of the RSM 310: a State Information Look Up Table (LUT) 702 which is a possible implementation of the LUT 311; a register holding an arrived fragment 704; and an Address Mapping Function 706. Also shown in the diagram 700 are the POQs (314 . . . 315) with the small tables ST.

The LUT 702 is a table of State information Records 708. The arrived fragment 704 includes a Fragment Data and a Fragment Address. The arrival of a fragment is similar to a memory write operation, and includes the Fragment Address at which the fragment is to be stored in the Packet Buffer 312 (FIG. 3A). The Fragment Address should be within the range of addresses of one of the buffer spaces within which the arriving fragment is to be stored for reassembly into a specific packet. The Address Mapping Function 706 converts the Fragment Address of the arrived fragment 704 into a state information pointer 707 to the specific State information Record 708 in the LUT 702 that corresponds to the specific packet being reassembled. The Address Mapping Function 706 may be as simple as taking the upper bits of the Fragment Address as the state information pointer 707 into the LUT 702. The state information pointer 707 may also be used to address the small tables ST of the POQs (314 . . . 315). Alternatively the small tables ST of each POQ may be addressed with a pointer that is generated internal to each POQ and is equivalent to the state information pointer 707.

According to embodiments of the present invention, the State Information Record 708 may include the following fields:

710 "Number of bytes received for this packet";
712 "Length of this packet"
714 "Flag bit indicating whether the first word of the packet has been received";
716 "Flag bit indicating if the current word location is the location of the new last byte";
718 "Flag bit indicating whether this is the first word received from this packet";
720 "Length valid bit";
722 "Restart bit";
724 "Destination id for the packet associated with this word"; and
726 "Address of the last word written into the POQ".

The field "Number of bytes received for this packet" 710 indicates the number of bytes received so far; because of the possible out-of-order arrival of fragments, this value is primarily of value in detecting when the complete packet has been received, i.e. when the number of bytes received equals the length of the packet.

The field "The length of this packet" 712 is initialized to zero and then copied from the header of the packet when the first word arrives.

The "Flag bit indicating whether the first word of the packet has been received" 714 is set after the first word of the packet has been received. This flag bit indicates whether the field 712 "The length of this packet" contains a valid value.

The "Flag bit indicating if the current word location is the location of the new last byte" 716 is set if the address of the current fragment is higher than the "Address of the last word written into the POQ" 726. If this is the case, the previously written "last word" is overwritten in the POQ, with the result that at the end, when the complete packet has been received, the true "last word" is in the POQ.

The "Flag bit indicating whether this is the first word received from this packet" 718 indicates whether the "first word" is presently available for processing, i.e. for extracting length and destination id information from it.

The "Length valid bit" 720 indicates whether the "Length of this packet" 712 has been extracted from the first word, and is thus valid. Until the length is valid, any comparison between the fields 710 "Number of bytes received for this packet" and 712 "Length of this packet" are meaningless.

The "Restart bit" 722 is set if the packet has been released to the POQ under the Early Release method, and may have to be restarted later.

The value of the field 724 "Destination id for the packet associated with this word" is copied from the header of the packet when the first word arrives. This value is forwarded to the plane output queue (POQ) to which the packet is eventually released for transmission. This allows a "last minute" decision to be made in the POQ to select one of a number of alternative paths that may be available in a switch plane 106 of the network 104. For example a switch plane implemented as large network may provide several alternative paths or channels within the switch plane. By not selecting the path until a packet is released, the absolutely latest updated path information may be used to route the packet.

The field 726 "Address of the last word written into the POQ" captures this address, for comparison with the addresses of subsequently received fragments, see 716 above.

The description of the packet transfer method 600 (FIG. 6) continues now with the step 606.

In the step 606 (FIG. 6) "Retrieve state information for fragment" the State Information Record 708 related to the present fragment is retrieved from the LUT 702, using the state information pointer 707 (see FIG. 7).

In the step "Write fragment into buffer" 608, the fragment is simply placed in the Packet Buffer 312 at the fragment address.

In the step "First or last word?" 610, a determination is made whether the received fragment contains either the first or the last word. If it does contain either ("YES" from the step 610) than the step "Write fragment into all POQs" 612 is executed, and the fragment is written to all POQs where only the relevant word may be stored in the small table ST of each respective POQ at the packet address that is derived from the Fragment Address in the manner described above, i.e. with a pointer that is equivalent to the state information pointer 707 as shown in FIG. 7.

In the step "Packet completion?" 614, it is determined if either the water mark has been reached (see "Early Release" above) by comparing the value of the field 710 "Number of bytes received for this packet" with the water mark, or if the packet is complete by comparing the fields 710 "Number of bytes received for this packet" and 712 "Length of this packet". If the water mark has not been reached nor is the packet complete ("NO" from the step 614) then the step 616 "Update state information" is executed next and execution returns to the step 602 "Wait for fragment" to wait for the next fragment; otherwise ("YES" from the step 614) execution proceeds to the step 618 "Packet released already?".

In the step 618 "Packet released already?" the state of the "Restart bit" 722 is tested. If the "Restart bit" 722 is set ("YES" from the step 618) then execution proceeds with the step 622 "Buffer underrun?", see below. If the "Restart bit" 722 is not set ("NO" from the step 618) this indicates that either:
 (a) the packet is complete in the Packet Buffer 312 and may be released, or
 (b) the packet has reached the water mark and may be released early.

In either case (a) or (b), execution proceeds with the step 620 "Release packet to POQ" in which the packet is released to the POQ that is the packet pointer is put at the tail of the packet pointer FIFO of the POQ, and transmission of the packet to the network may begin any time thereafter.

After the step 620 "Release packet to POQ", the State Information Record 708 of the packet is updated in the step 616 "Update state information", and execution loops back to the beginning of the packet transfer method 600, that is the step 602 "Wait for fragment" to wait for the next fragment. As noted earlier, the RSM 310 is able to process multiple packets concurrently, and dispose of fragments by placing them into the packet buffer 312 in any order. The next fragment to arrive may thus be any fragment, not necessarily the next fragment in order (or reverse order) of the same packet, nor necessarily a fragment that is part of the same packet.

The step 622 "Buffer underrun?" is reached only if early release for this packet had been exercised previously. In the step 622 "Buffer underrun?", the possibility of buffer underrun is determined by comparing the fields 710 "Number of bytes received for this packet" and 712 "Length of this packet" of the State Information Record 708. If they match, buffer underrun has not occurred ("NO" from the step 622), and execution continues with the step 616 "Update state information", other wise ("YES" from the step 622) the packet is restarted, and released to the POQ again in the step 620 "Release packet to POQ".

The HPNA according to embodiments of the present invention thus provides a node efficiently linking up to M packetized processor links running a processor oriented packet protocol carrying small memory fragments; with up to N network links running a packet protocol capable of larger packets and being routed through a switching network. A number of techniques have been described which are designed to keep the latency of packet transfer through the HPNA low, including:

- sharing the single packet buffer and the receive state machine to reassemble packets from memory fragments that may arrive in any order;
- transmitting the reassembled packets as the modified packets in reverse order to take advantage of the receiving processor's memory cache;
- transmitting the first and last words of a packet into the output stream ahead, bypassing the packet buffer to gain a few clock cycles;
- broadcasting the first and last words to the output queues for all switch planes, in order to defer the decision on the switch plane selection and path selection until just in time for the transmission, thus enabling a policy for distributing the traffic, based on up to date information;
- providing overlapping transmission in the upstream direction by early release of partially assembled packets; and
- providing very low latency cut-through operation in the downstream direction.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A network adapter, comprising:
   an array of downstream packet processors, each downstream packet processor being configured to process an incoming data packet received from a network, and
   an upstream packet processor, the upstream packet processor being configured to process an outgoing data packet to be transmitted over the network, the upstream packet processor including:
      a direct memory access (DMA) engine configured to read the outgoing data packet from a memory of a processor and to transfer the read outgoing data packet;
      a packet buffer, and
      a reassembly state machine (RSM) configured to receive the transferred outgoing data packet from the processor as a plurality of out-of-order fragments and to store the received plurality of out-of-order fragments in the packet buffer in a correct sequential order as a reassembled outgoing data packet;
   wherein the DMA engine is further configured to transfer the read outgoing data packet such that the out-of-order fragments are received by the RSM in reverse order, relative to the order in which the outgoing data packet was stored in the memory of the processor.

2. The network adapter of claim 1, wherein each fragment includes fragment data and an associated fragment address, and wherein the RSM is configured to store the fragment data of each fragment in the packet buffer at the fragment address associated with the fragment data.

3. The network adapter of claim 1, further including a plurality of physical I/O blocks, each of the physical I/O blocks being coupled to the network.

4. The network adapter of claim 3, wherein the network includes a plurality of packet switching planes, and wherein each of the plurality of physical I/O blocks is coupled to one of the plurality of packet switching planes of the network.

5. The network adapter of claim 3, wherein each fragment includes a plurality of words and wherein the network adapter further includes a plurality of plane output queues (POQ), each POQ being coupled to a corresponding one of the plurality of physical I/O blocks and each being configured to read words from the packet buffer.

6. The network adapter of claim 5, wherein each of the POQs includes means to select one of a number of alternative paths that may be available in the corresponding one of the plurality of packet switching planes of the network.

7. The network adapter of claim 5, wherein the outgoing data packet includes a first fragment having a first word and a last fragment having a last word and wherein the RSM is further configured to store the first word and the last word of the outgoing data packet in at least one of the plurality of POQs.

8. The network adapter of claim 7, wherein a selected one of the plurality of POQs is configured to read all but the first and last words of the outgoing packet from the packet buffer and to send the stored first word, the words read from the packet buffer and the stored last word to the physical I/O block associated with the selected POQ for transmission to the packet switching plane coupled to the selected physical I/O block.

9. The network adapter of claim 8, wherein the selected POQ is configured to read all but the first and last words of the outgoing packet from the packet buffer in a reverse order.

10. The network adapter of claim 7, wherein the first word includes information related to a length of the outgoing packet and a destination of the outgoing data packet on the network.

11. The network adapter of claim 1, wherein the RSM is configured to release at least one fragment of the outgoing data packet from the packet buffer for transmission over the network before all remaining fragments of the outgoing data packet have been received in the packet buffer.

12. The network adapter of claim 1, wherein the RSM is configured to release at least one fragment of the outgoing data packet from the packet buffer for transmission over the network when all of the fragments of the outgoing data packet are stored in the packet buffer.

13. The network adapter of claim 1, wherein the RSM is configured to release at least one fragment of the outgoing data packet from the packet buffer for transmission on the network when an adjustable fill level threshold of the packet buffer is reached.

14. The network adapter of claim 1, wherein each downstream packet processor of the array of downstream packet processors is configured to forward the incoming data packet received from the network into a memory of a destination processor.

15. The network adapter of claim 14, wherein each downstream packet processor of the array of downstream packet processors is further configured to store the incoming data packet received from the network in an internal memory if the memory of the destination processor is full.

16. A computer, comprising:
   a network;
   a plurality of compute modules, each compute module being coupled to the packet network and each including:
      a plurality of processors, and
      a network adapter, the network adapter being coupled to each of the plurality of processors, the network adapter including:

an array of downstream packet processors, each downstream packet processor being configured to process an incoming data packet received from the network, and an upstream packet processor, the upstream packet processor being configured to process an outgoing data packet to be transmitted over the network, the upstream packet processor including:

a direct memory access (DMA) engine configured to read the outgoing data packet from a memory of a processor and to transfer the read outgoing data packet;

a packet buffer, and a reassembly state machine (RSM) configured to receive the transferred outgoing data packet from the processor as a plurality of out-of-order fragments and to store the received plurality of out-of-order fragments in the packet buffer in a correct sequential order as a reassembled outgoing data packet;

wherein the DMA engine is further configured to transfer the read outgoing data packet such that the out-of-order fragments are received by the RSM in reverse order, relative to the order in which the outgoing data packet was stored in the memory of the processor.

17. The computer of claim 16, wherein each fragment includes fragment data and an associated fragment address, and wherein the RSM is configured to store the fragment data of each fragment in the packet buffer at the fragment address associated with the fragment data.

18. The computer of claim 16, further including a plurality of physical I/O blocks, each of the physical I/O blocks being coupled to the network.

19. The computer of claim 18, wherein the network includes a plurality of packet switching planes, and wherein each of the plurality of physical I/O blocks is coupled to one of the plurality of packet switching planes of the network.

20. The computer of claim 18, wherein each fragment includes a plurality of words and wherein the network adapter further includes a plurality of plane output queues (POQ), each of the POQ being coupled to a corresponding one of the plurality of physical I/O blocks and each being configured to read words from the packet buffer.

21. The computer of claim 20, wherein the outgoing data packet includes a first fragment having a first word and a last fragment having a last word and wherein the RSM is further configured to store the first word and the last word of the outgoing data packet in at least one of the plurality of POQ.

22. The computer of claim 21, wherein a selected one of the plurality of POQ is configured to read all but the first and last words of the outgoing packet from the packet buffer and to send the stored first word, the words read from the packet buffer and the stored last word to the physical I/O block associated with the selected POQ for transmission to the packet switching plane coupled to the selected physical I/O block.

23. The computer of claim 22, wherein the selected POQ is configured to read all but the first and last words of the outgoing packet from the packet buffer in a reverse order, 24. The computer of claim 21, wherein the first word includes information related to a length of the outgoing packet and a destination of the outgoing data packet on the network.

25. The computer of claim 16, wherein the RSM is configured to release at least one fragment of the outgoing data packet from the packet buffer for transmission over the network before all remaining fragments of the outgoing data packet have been stored in the packet buffer.

26. The computer of claim 16, wherein the RSM is configured to release at least one fragment of the outgoing data packet from the packet buffer for transmission over the network when all of the fragments of the outgoing data packet are stored in the packet buffer.

27. The computer of claim 16, wherein the RSM is configured to release at least one fragment of the outgoing data packet from the packet buffer for transmission on the network when an adjustable fill level threshold of the packet buffer is reached.

28. The computer of claim 16, wherein each downstream packet processor of the array of downstream packet processors is configured to forward the incoming data packet received from the network into the memory of the destination processor.

29. The computer of claim 28, wherein each downstream packet processor of the array of downstream packet processors is further configured to store the incoming data packet received from the network in an internal memory if the memory of the destination processor is full.

30. A method of sending a data packet over a network of a computer system, comprising the steps of:

providing a network adapter;

fragmenting the data packet into a plurality of fragments;

beginning to send the plurality of fragments to the network adapter;

after the network adapter has received some but not all of the plurality of fragments, transmitting the received fragments from the network adapter to the network;

after the network adapter has begun transmitting the received fragments over the network but before all of the data packet is transmitted to the network, receiving any remaining fragments of the data packet into the network adapter, and transmitting the received remaining fragments from the network adapter to the network;

wherein the network adapter includes a DMA engine and an RSM and wherein the DMA engine is further configured to transfer the outgoing data packet such that the fragments are received by the RSM in reverse order relative to the order in which the outgoing data packet was stored in the memory the computer system.

31. The method of claim 30, further comprising a step of providing an adjustable fill level threshold that defines how much of the data packet must be received by the network adapter before the network adapter can begin to transmit received fragments to the network.

32. The method of claim 31, wherein the adjustable fill level threshold is less than 100% of the data packet.

33. The method of claim 31, further comprising a step of selectively adjusting the fill level threshold downward when a rate at which the network adapter receives fragments of the data packet is greater than a rate at which the network adapter transmits the fragments to the network.

34. The method of claim 31, further comprising a step of selectively adjusting the fill level threshold upward when the transmitting steps cannot transmit without interruption.

35. A computer, comprising:

a packet switching network;

a processor;

a network adapter, the network processor being coupled to the processor and to the packet switching network, the network adapter being configured to receive constituent fragments of a data packet to be sent over the packet switching network from the processor and to transmit at least one received fragment to the packet switching network before having received all of the constituent fragments of the outgoing data packet from the processor;
wherein the network adapter includes a DMA engine and an RSM, and wherein the DMA engine is further configured to transfer the outgoing data packet such that the constituent fragments are received by the RSM in reverse order relative to the order in which the outgoing data packet was stored in the memory of the computer.

36. The computer of claim 35, further comprising an adjustable fill level threshold configured to define how much of the data packet must be received by the network adapter before the network adapter can begin to transmit received fragments to the packet switching network.

37. The computer of claim 36, wherein the adjustable fill level threshold is less than 100% of the data packet.

38. The computer of claim 36, wherein the network adapter is further configured to selectively adjust the fill level threshold downward when a rate at which the network adapter receives fragments of the data packet is greater than a rate at which the network adapter transmits the fragments to the packet switching network.

39. The computer, of claim 36, wherein the network adapter is further configured to selectively adjust the fill level threshold upward when the fragments are not received from the processor in time to continue transmitting without interruption to the packet switched network.

40. A method for receiving and processing a plurality of data packets from a plurality of processors, each of the data packets including a plurality of fragments that are ordered according to a first order, the method comprising the steps of:
providing a packet buffer;
providing a reassembly state machine (RSM) coupled to the packet buffer;
providing a direct memory access engine configured to read the data packets from at least one of the plurality of processors and to transfer the read data packets to the RSM;
receiving, in the RSM, the transferred data packets as a plurality of fragments in a second order that is the reverse of the first order, each received fragment including a data fragment and an associated fragment address, and
storing the fragment data of each of the received plurality of fragments in the packet buffer at the fragment address associated with the received data fragment, such that the transferred data packets are reassembled and stored in the packet buffer in the first order.

41. The method of claim 40, wherein the receiving and storing steps are effective to receive and reassemble up to P data packets, P being a maximum number of data packets that can be stored in the packet buffer.

42. The method of claim 40, further comprising a step of monitoring a fill level of the packet buffer to determine how full the packet buffer is.

43. The method of claim 40, further including a step of releasing the reassembled data packets for transmission to a destination processor over a network, 44. The method of claim 43, wherein the releasing step is carried out by the RSM.

45. The method of claim 43, wherein the releasing step is carried out when a data packet is fully reassembled in the packet buffer.

46. The method of claim 43, wherein the releasing step is carried out when only a predetermined portion of a data packet is reassembled in the packet buffer.

47. A method of transmitting a data packet stored in a memory of a processor to a network, comprising the steps of:
providing a network adapter, the network adapter including a reassembly state machine (RSM), a packet buffer, a Packet Output Queue (POQ) and a physical I/O block coupled to the POQ and to the network;
fragmenting the stored data packet into a plurality of fragments, each including a plurality of words, and transmitting the plurality of fragments to the RSM;
sending fragments from the RSM to the packet buffer and storing the sent fragments in the packet buffer;
sending a first word of a first of the plurality of fragments and a last word of a last of the plurality of fragments from the RSM to the POQ and storing the first and last words in the POQ;
accessing, by the POQ, the packet buffer and retrieving therefrom all but the first and last words of the data packet in reverse order, and
sending a modified data packet that includes the first word, the last word and the words retrieved from the packet buffer to the physical I/O block for transmission to the network;
wherein the fragments are received by the RSM in reverse order relative to the order in which the outgoing data packet was stored in the memory of the processor.

48. The method of claim 47, wherein the first and last words are stored in a small table in the POQ and wherein the first and last words are sent to the physical I/O block for transmission to the network while the accessing and retrieving steps are carried out.

49. The method of claim 47, wherein the transmitting step to transmit the plurality of fragments to the RSM is carried out with each fragment including fragment data and an associated fragment address, and wherein the step of storing the sent fragments in the packet buffer is carried out by storing the fragment data of each fragment in the packet buffer at its associated fragment address.

50. The method of claim 49, wherein the step of transmitting the plurality of fragments to the RSM is carried out with the plurality of fragments being out-of-order.

51. The method of claim 47, further comprising a step of providing the POQ with a first-in-first-out (FIFO) buffer configured to store packet pointers, each packet pointer being an address in the packet buffer of a packet stored therein and wherein when an outgoing packet is ready to be released to the POQ for transmission to the network, the RSM carries out a step of adding a pointer to the outgoing packet in the packet buffer to a tail of the FIFO in the POQ.

52. The method of claim 51, wherein the accessing and retrieving steps include a step of accessing and retrieving a packet stored at an address in the packet buffer pointed to by a packet pointer at a head of the FIFO in the POQ.

53. The method of claim 47, wherein the network is a packet switching network that includes a plurality of switch planes and wherein the providing step provides a separate POQ and a separate physical I/O block for each of the plurality of switch planes, each POQ being coupled to a separate one of the physical I/O blocks and each physical I/O block being coupled to a separate one of the plurality of switch planes.

54. The method of claim 53, further including a step of making an explicit selection of one of the plurality of switch planes and wherein the POQ is that POQ that is coupled to physical I/O block that is coupled to the selected switch plane.

55. The method of claim 53, further including making a wildcard selection of one the plurality of switch planes, and wherein the POQ is that POQ that has a smallest number of data packets waiting to be transmitted to the network.

56. A method for transmitting a data packet stored in a memory of a processor to a network, comprising the steps of:
providing a network adapter, the network adapter including a reassembly state machine (RSM), a packet buffer, a Packet Output Queue (POQ) and a physical I/O block coupled to the POQ and to the network;
fragmenting the stored data packet into a plurality of fragments, each including a plurality of words, and transmitting the plurality of fragments to the RSM;
sending fragments from the RSM to the packet buffer and storing the sent fragments in the packet buffer;
sending a first word of a first of the plurality of fragments and a last word of a last of the plurality of fragments from the RSM to the POQ and storing the first and last words in the POQ;
accessing, by the POQ, the packet buffer and retrieving therefrom all but the first and last words of the data packet, and
sending the first word, the words retrieved from the packet buffer and the last word to the physical I/O block for transmission to the network;
wherein the fragments are received by the RSM in reverse order relative to the order in which the outgoing data packet was stored in the memory of the processor.

57. The method of claim 56, wherein the first and last words are stored in a small table in the POQ and wherein the first word is sent to the physical I/O block for transmission to the network while the accessing and retrieving steps are carried out.

58. The method of claim 57, wherein both the first and the last words are sent to the physical I/O block while the accessing and retrieving steps are carried out.

59. The method of claim 56, wherein the transmitting step to transmit the plurality of fragments to the RSM is carried out with each fragment including fragment data and an associated fragment address, and wherein the step of storing the sent fragments in the packet buffer is carried out by storing the fragment data of each fragment in the packet buffer at its associated fragment address.

60. The method of claim 59, wherein the step of transmitting the plurality of fragments to the RSM is carried out with the plurality of fragments being out-of-order.

61. The method of claim 56, further comprising a step of providing the POQ with a first-in-first-out (FIFO) buffer configured to store packet pointers, each packet pointer being an address in the packet buffer of a packet stored therein and wherein when an outgoing packet is ready to be released to the P00 for transmission to the network, the RSM carries out a step of adding a pointer to the outgoing packet in the packet buffer to a tail of the FIFO in the POQ.

62. The method of claim 61, wherein the accessing and retrieving steps include a step of accessing and retrieving a packet stored at an address in the packet buffer pointed to by a packet pointer at a head of the FIFO in the POQ.

63. The method of claim 56, wherein the POQ retrieves the words of the data packet in reverse order.

64. The method of claim 56, wherein the network is a packet switching network that includes a plurality of switch planes and wherein the providing step provides a separate POQ and a separate physical I/O block for each of the plurality of switch planes, each physical I/O block being coupled to a separate one of the plurality of switch planes.

65. The method of claim 64, further including a step of making an explicit selection of one of the plurality of switch planes and wherein the POQ is that POQ that is coupled to physical I/O block that is coupled to the selected switch plane.

66. The method of claim 64, further including making a wildcard selection of one the plurality of switch planes, and wherein the POQ is that POQ that has a smallest number of data packets waiting to be transmitted to the network.

67. A method for transmitting a data packet stored in a memory of a processor to a packet switching network that includes a plurality of switch planes, comprising the steps of:
providing a network adapter, the network adapter including a reassembly state machine (RSM), a packet buffer, and a plurality of Packet Output Queue (POQ), one POQ being associated with each of the plurality of switch planes;
fragmenting the stored data packet into a plurality of fragments, each including a plurality of words, and transmitting the plurality of fragments to the RSM;
sending fragments from the RSM to the packet buffer and storing the sent fragments in the packet buffer;
storing, by the RSM, a first word of a first of the plurality of fragments and a last word of a last of the plurality of fragments in each of the plurality of POQ;
selecting one of the plurality of switch planes;
accessing, by the POQ associated with the selected switch plane, the packet buffer and retrieving therefrom all but the first and last words of the data packet to reassemble the data packet, and
transmitting the reassembled data packet to the selected switch plane;
wherein the fragments are received by the RSM in reverse order relative to the order in which the outgoing data packet was stored in the memory of the processor.

68. The method of claim 67, wherein the selecting step includes making an explicit selection of one of the plurality of switch planes.

69. The method of claim 67, wherein the selecting step is carried out such that the selected switch plane is associated with a POQ of the plurality of POQ having a smallest number of data packets waiting to be transmitted.

70. The method of claim 67, wherein the providing step further provides a physical I/O block coupled between each POQ and one of the plurality of switch planes and wherein the transmitting step includes sending the reassembled data packet to the physical I/O block coupled to the POQ associated with the selected switch plane, for transmission to the selected switch plane.

71. The method of claim 67, further comprising selecting one of a plurality of paths in the selected switch plane and wherein the transmitting step includes transmitting the reassembled data packet on selected path of the selected switch plane.

* * * * *